(12) United States Patent
Sato

(10) Patent No.: US 12,378,406 B2
(45) Date of Patent: Aug. 5, 2025

(54) MIXTURE OF POLYOXYALKYLENE POLYMERS AND CURABLE COMPOSITION

(71) Applicant: KANEKA CORPORATION, Osaka (JP)

(72) Inventor: Akinori Sato, Takasago (JP)

(73) Assignee: KANEKA CORPORATION, Osaka (JP)

( * ) Notice: Subject to any disclaimer, the term of this patent is extended or adjusted under 35 U.S.C. 154(b) by 532 days.

(21) Appl. No.: 17/936,920

(22) Filed: Sep. 30, 2022

(65) Prior Publication Data

US 2023/0027947 A1    Jan. 26, 2023

Related U.S. Application Data

(63) Continuation of application No. PCT/JP2021/011754, filed on Mar. 22, 2021.

(30) Foreign Application Priority Data

Mar. 31, 2020    (JP) .................................. 2020-061829

(51) Int. Cl.
*C08L 71/02*    (2006.01)

(52) U.S. Cl.
CPC .................................. *C08L 71/02* (2013.01)

(58) Field of Classification Search
CPC .... C08F 220/14; C08F 220/085; C08L 33/12; C08L 33/04
See application file for complete search history.

(56) References Cited

U.S. PATENT DOCUMENTS

| | | |
|---|---|---|
| 2015/0133622 A1 | 5/2015 | Harumashi et al. |
| 2021/0284797 A1* | 9/2021 | Sato ..................... C08G 65/12 |
| 2022/0002541 A1* | 1/2022 | Sato ....................... C08L 33/04 |

FOREIGN PATENT DOCUMENTS

| | | | | |
|---|---|---|---|---|
| JP | S52-73998 A | 6/1977 | | |
| WO | 2013/180203 A1 | 12/2013 | | |
| WO | WO-2015105122 A1 * | 7/2015 | ......... | C08G 65/2609 |
| WO | WO-2020110713 A1 * | 6/2020 | ........ | C08F 220/1804 |
| WO | WO-2020196228 A1 * | 10/2020 | ........... | C08G 65/336 |

OTHER PUBLICATIONS

WO2015105122, English machine translation, prepared May 7, 2025 (Year: 2025).*
International Search Report issued in corresponding International Application No. PCT/JP2021/011754 mailed Jun. 1, 2021, with translation (5 pages).
Written Opinion issued in corresponding International Application No. PCT/JP2021/011754 mailed Jun. 1, 2021, (4 pages).

* cited by examiner

*Primary Examiner* — Christopher M Rodd
(74) *Attorney, Agent, or Firm* — Osha Bergman Watanabe & Burton LLP

(57) ABSTRACT

A mixture of polymers (A) and (B), each of the polymers (A) and (B) having a polyoxyalkylene main chain structure and a terminal structure bonded to an end of the main chain structure, is provided. The terminal structures include hydrolyzable silyl groups and further include terminal olefin groups and/or internal olefin groups. The number of the terminal structures per molecule of the polymer (A) is 1.5 or more on average and the number of the terminal structures per molecule of the polymer (B) is 1.2 or less on average. In each of the polymers (A) and (B), the total number of the hydrolyzable silyl, terminal olefin, and internal olefin groups is more than 1.0 on average per terminal structure. In the whole mixture, the percentage of the hydrolyzable silyl groups to the total of the hydrolyzable silyl, terminal olefin, and internal olefin groups is from 40 to 75%.

17 Claims, No Drawings

MIXTURE OF POLYOXYALKYLENE POLYMERS AND CURABLE COMPOSITION

TECHNICAL FIELD

One or more embodiments of the present invention relate to a mixture of hydrolyzable silyl group-containing polyoxyalkylene polymers and a curable composition containing the mixture.

BACKGROUND

Hydrolyzable silyl group-containing polymers are known as moisture-reactive polymers. These polymers are contained in many industrial products such as adhesives, sealing materials, coating materials, paints, and pressure-sensitive adhesives, and are used in diverse fields.

Polymer backbones known as those of the above polymers include polyoxyalkylene polymers, saturated hydrocarbon polymers, and (meth)acrylic ester polymers. In particular, a hydrolyzable silyl group-containing polyoxyalkylene polymer has a relatively low viscosity at room temperature and is easy to handle. Further, a cured product resulting from a reaction of the polyoxyalkylene polymer exhibits good elasticity. By virtue of these and other features, the polyoxyalkylene polymer can be used in a wide range of applications.

Patent Literature 1 discloses a room temperature-curing composition containing a polyoxyalkylene polymer having a hydrolyzable silyl group at at least one end of the polymer. This literature describes a method of producing the polymer, the method consisting of: converting a terminal hydroxy group of a polyoxyalkylene polymer to an alkoxide group; then reacting the polymer with an organic halide such as allyl chloride to introduce a carbon-carbon double bond into the terminal group; and further subjecting the polymer to an addition reaction with a hydrosilane to convert the terminal group to the hydrolyzable silyl group.

Patent Literature 2 discloses a polyoxyalkylene polymer having two or more hydrolyzable silyl groups in one terminal moiety. This literature describes a method of producing the polymer, the method consisting of: first converting a terminal hydroxy group of a polymer to an alkoxide group; then reacting the polymer with a carbon-carbon double bond-containing epoxy compound and further with a carbon-carbon double bond-containing organic halide such as allyl chloride to introduce two or more carbon-carbon double bonds into one terminal moiety; and subsequently subjecting the polymer to an addition reaction with a hydrosilane.

In the recent building industry, there is an increasing demand for sealing materials less prone to bleed-out. To meet this demand, a technique for preparing a curable composition for sealing materials has been investigated in which a conventional phthalic ester-based or PPG-based plasticizer is not used but in which a reactive diluent having a hydrolyzable silyl group introduced at only one end of a polymer molecular chain is added instead of the conventional plasticizer.

PATENT LITERATURE

PTL 1: Japanese Laid-Open Patent Application Publication No. S52-73998
PTL 2: WO 2013/180203

The addition of such a reactive diluent to a curable composition containing a hydrolyzable silyl group-containing polyoxyalkylene polymer can prevent bleed-out, but tends to decrease the recovery performance of a cured product of the composition (the "recovery performance" refers to the ability to return to the original shape after application of a given deformation). A possible approach to this issue may be to improve the recovery performance by increasing the modulus of a cured product of the hydrolyzable silyl group-containing polyoxyalkylene polymer used as the base polymer (the "modulus" generally refers to a stress required to apply a given deformation and in this case refers particularly to a stress at elongation of a dumbbell-shaped specimen). However, the modulus is desirably kept low because an increase in modulus can lead to a decrease in flexibility.

SUMMARY

In view of the above circumstances, one or more embodiments of the present invention aim to provide: a hydrolyzable silyl group-containing polyoxyalkylene polymer mixture with which a cured product able to exhibit low modulus and at the same time high recovery performance can be made; and a curable composition containing the mixture.

As a result of intensive studies, the present inventors have found that two polyoxyalkylene polymers each of which has terminal structures and a mixture of the polymers meet the following requirements, the mixture can be provided as a hydrolyzable silyl group-containing polyoxyalkylene polymer mixture with which a cured product able to exhibit low modulus (namely, high flexibility) and at the same time high recovery performance can be made: the terminal structures include hydrolyzable silyl groups and further include terminal olefin groups and/or internal olefin groups; the number of the terminal structures in one of the polymers is 1.5 or more (or 2 or more) on average per polymer molecule; the number of the terminal structures in the other polymer is 1.2 or less (or 1) on average per polymer molecule; in each polymer, the total number of the hydrolyzable silyl, terminal olefin, and internal olefin groups is more than 1.0 on average per terminal structure; and in the whole mixture, the percentage of the number of moles of the hydrolyzable silyl groups to the total number of moles of the hydrolyzable silyl, terminal olefin, and internal olefin groups is set relatively low, in particular in the range of 40 to 75%. Based on this finding, the inventors have arrived at one or more embodiments of the present invention.

Specifically, a first aspect of one or more embodiments of the present invention relates to a mixture of polyoxyalkylene polymers (A) and (B), each of the polyoxyalkylene polymers (A) and (B) having a polyoxyalkylene main chain structure and a terminal structure bonded to an end of the main chain structure, wherein
  the terminal structures include hydrolyzable silyl groups and further include terminal olefin groups and/or internal olefin groups,
  the number of the terminal structures per molecule of the polyoxyalkylene polymer (A) is 1.5 or more on average,
  the number of the terminal structures per molecule of the polyoxyalkylene polymer (B) is 1.2 or less on average,
  in each of the polyoxyalkylene polymers (A) and (B), the total number of the hydrolyzable silyl, terminal olefin, and internal olefin groups in the terminal structures is more than 1.0 on average per terminal structure, and
  in the whole mixture, the percentage of the number of moles of the hydrolyzable silyl groups to the total number of moles of the hydrolyzable silyl, terminal olefin, and internal olefin groups is from 40 to 75%.

Preferably, the number of the terminal structures in the molecule of the polyoxyalkylene polymer (A) is two or more, and the number of the terminal structures in the molecule of the polyoxyalkylene polymer (B) is one.

A second aspect of one or more embodiments of the present invention relates to a mixture of polyoxyalkylene polymers (A) and (B), each of the polyoxyalkylene polymers (A) and (B) having a polyoxyalkylene main chain structure and a terminal structure bonded to an end of the main chain structure, wherein
  the terminal structures include hydrolyzable silyl groups and further include terminal olefin groups and/or internal olefin groups,
  the number of the terminal structures in the molecule of the polyoxyalkylene polymer (A) is two or more,
  the number of the terminal structures in the molecule of the polyoxyalkylene polymer (B) is one,
  in each of the polyoxyalkylene polymers (A) and (B), the total number of the hydrolyzable silyl, terminal olefin, and internal olefin groups in the terminal structures is more than 1.0 on average per terminal structure, and
  in the whole mixture, the percentage of the number of moles of the hydrolyzable silyl groups to the total number of moles of the hydrolyzable silyl, terminal olefin, and internal olefin groups is from 40 to 75%.

Preferably, the number of the terminal structures in the molecule of the polyoxyalkylene polymer (A) is two.

In the first and second aspects, a modulus at 100% elongation of a cured product of the mixture is preferably 0.30 MPa or less.

Preferably, in the whole mixture, the percentage of the number of moles of the hydrolyzable silyl groups to the total number of moles of the hydrolyzable silyl, terminal olefin, and internal olefin groups is from 40 to 70%.

Preferably, the terminal structures include a terminal structure containing a moiety derived from an epoxy compound having the terminal olefin group.

Preferably, in the whole mixture, the total number of the hydrolyzable silyl, terminal olefin, and internal olefin groups in the terminal structures is more than 2.0 on average per terminal structure.

Preferably, the hydrolyzable silyl group is represented by the following formula (3):

$—SiR^2Y_2$ (3), wherein $R^2$ represents a substituted or unsubstituted monovalent hydrocarbon group having 1 to 20 carbon atoms or a triorganosiloxy group represented by $(R')_3SiO—$, $R'$ represents a substituted or unsubstituted monovalent hydrocarbon group having 1 to 20 carbon atoms, the three $R'$ groups being the same or different, and Y represents a hydroxy group or a hydrolyzable group, the two Y groups being the same or different.

Preferably, in the whole mixture, the number of the hydrolyzable silyl groups is 1.0 or more on average per terminal structure.

One or more embodiments of the present invention also relate to a curable composition containing the mixture as defined above.

Preferably, the curable composition further contains a reactive diluent (D) that is a polymer having 0.5 to less than 1.2 hydrolyzable silyl groups on average per molecule and having a lower viscosity at 23° C. than the mixture.

Preferably, the curable composition further contains a (meth)acrylic ester polymer (C) having a hydrolyzable silyl group.

One or more embodiments of the present invention further relate to a cured product of the curable composition.

One or more embodiments of the present invention further relate to a method of producing the mixture according to the first aspect, the method including the steps of: forming the polyoxyalkylene main chain structures by polymerizing an epoxy compound with a mixture of an initiator having 1.5 or more hydroxy groups on average per molecule and an initiator having 1.2 or less hydroxy groups on average per molecule; and forming the terminal structures at the ends of the main chain structures. Preferably, the initiator having 1.5 or more hydroxy groups on average per molecule has two or more hydroxy groups in the molecule, and the initiator having 1.2 or less hydroxy groups on average per molecule has one hydroxy group in the molecule.

One or more embodiments of the present invention further relate to a method of producing the mixture according to the second aspect, the method including the steps of: forming the polyoxyalkylene main chain structures by polymerizing an epoxy compound with a mixture of an initiator having two or more hydroxy groups in the molecule and an initiator having one hydroxy group in the molecule; and forming the terminal structures at the ends of the main chain structures.

One or more embodiments of the present invention can provide: a hydrolyzable silyl group-containing polyoxyalkylene polymer mixture with which a cured product able to exhibit low modulus and at the same time high recovery performance can be made; and a curable composition containing the mixture.

DETAILED DESCRIPTION

Hereinafter, one or more embodiments of the present invention will be described in detail.

<Mixture of Polyoxyalkylene Polymers (A) and (B)>

Each of the polyoxyalkylene polymers (A) and (B) contained in the mixture of the present disclosure has a polyoxyalkylene main chain structure and a terminal structure bonded to an end of the main chain structure. The "mixture of the present disclosure" refers to a mixture consisting essentially of the polyoxyalkylene polymers (A) and (B).

The "main chain structure" refers to a polymer main chain composed of oxyalkylene repeating units. The main chain structure may be linear or branched. The main chain structure may be a polymer main chain consisting solely of the oxyalkylene repeating units or a polymer main chain including structures derived from an initiator used for polymerization in addition to the oxyalkylene repeating units and consisting solely of the oxyalkylene repeating units and the initiator-derived structures. The "oxyalkylene repeating unit" refers to a structural repeating unit of a polyether and is, for example, an oxyalkylene unit having 2 to 6 and preferably an oxyalkylene unit having 2 to 4 carbon atoms.

Examples of the polyoxyalkylene main chain structure include, but are not limited to, polyoxyethylene, polyoxypropylene, polyoxybutylene, polyoxytetramethylene, polyoxyethylene-polyoxypropylene copolymer, and polyoxypropylene-polyoxybutylene copolymer. Preferred is polyoxypropylene. One polymer may be used alone, or two or more polymers may be used in combination, as the main chain structure. The main chain structure of the polyoxyalkylene polymer (A) and the main chain structure of the polyoxyalkylene polymer (B) may be the same or different.

The "terminal structure" refers to a moiety that does not contain the oxyalkylene repeating unit of the main chain structure and that is bonded to an end of the main chain structure. The terminal structures include hydrolyzable silyl groups and further include terminal olefin groups and/or internal olefin groups. A terminal group that does not contain any of the hydrolyzable silyl, terminal olefin, and internal olefin groups (e.g., a butyl group bonded to an end of the main chain structure) is not classified as the terminal structure.

For example, when the main chain structure of the polyoxyalkylene polymer (A) is linear, the number of the terminal structures per molecule of the polymer (A) is up to two. When the main chain structure of the polymer (A) is branched and has, for example, a three-branched chain, the number of the terminal structures per molecule of the polymer (A) is up to three. The number of the terminal structures per molecule of the polymer (A) can be 3 or more depending on the structure of the branched chain. When the main chain structure of the polymer (A) is a mixture of a linear structure and a branched structure, the number of the terminal structures per polymer molecule can be between 2 and 3 on average. The terminal structure may be bonded via an oxygen atom to the oxyalkylene unit located at an end of the main chain structure.

Each of the polyoxyalkylene polymers (A) and (B) has terminal structures including hydrolyzable silyl groups and further including terminal olefin groups, internal olefin groups, or both. The statement that the terminal structures include hydrolyzable silyl groups and further include terminal olefin groups and/or internal olefin groups is not intended to mean that every terminal structure contained in the polymer has a hydrolyzable silyl group and a terminal olefin group and/or an internal olefin group, but intended to mean that terminal structures in the whole polymer (A) or (B) composed of a large number of polymer molecules include hydrolyzable silyl groups and further include terminal olefin groups and/or internal olefin groups. That is, a terminal structure of a molecule of the polymer (A) or (B) may have only a hydrolyzable silyl group and have neither a terminal olefin group nor an internal olefin group or may have a terminal olefin group, an internal olefin group, or both while having no hydrolyzable silyl group.

In the first aspect of one or more embodiments of the present invention, the number of the terminal structures per molecule of the polyoxyalkylene polymer (A) is 1.5 or more on average, preferably 1.7 or more on average, and more preferably 1.9 or more on average. The upper limit of the number of the terminal structures per molecule of the polymer (A) is not limited to a particular value, and the number of the terminal structures per molecule of the polymer (A) is preferably 4 or less on average, more preferably 3 or less on average, and particularly preferably 2 or less on average. In the first aspect, the polymer (A) may be a polymer in which the number of the terminal structures in the molecule is two or more or a polymer in which the number of the terminal structures in the molecule is two.

In the second aspect of one or more embodiments of the present invention, the polyoxyalkylene polymer (A) is a polymer in which the number of the terminal structures in the molecule is two or more. The upper limit of the number of the terminal structures per molecule of the polymer (A) is not limited to a particular value, and the number of the terminal structures per molecule of the polymer (A) may be 4 or less or 3 or less. The polyoxyalkylene polymer (A) may be a polymer in which the number of the terminal structures in the molecule is two. In the second aspect, the number of the terminal structures in the polymer molecule is not an average value.

In the case where the polyoxyalkylene polymer (A) has a linear main chain structure, there are two molecular chain ends. The number of the terminal structures in the molecule of the polyoxyalkylene polymer (A) is two when both of the two molecular chain ends contain the terminal structure. The polyoxyalkylene polymer (A) with a linear main chain structure can be produced, for example, by polymerizing an epoxy compound in the presence of an initiator having two hydroxy groups in the molecule and then carrying out a one-step or multi-step reaction for introducing hydrolyzable silyl groups into the polymer.

In the case where the polyoxyalkylene polymer (A) has a branched main chain structure, there are three or more molecular chain ends. The number of the terminal structures in the molecule of the polyoxyalkylene polymer (A) is two or more when at least two of the molecular chain ends (preferably, all of the molecular chain ends) contain the terminal structure. The polyoxyalkylene polymer (A) with a branched main chain structure can be produced, for example, by polymerizing an epoxy compound in the presence of an initiator having three or more hydroxy groups in the molecule and then carrying out a one-step or multi-step reaction for introducing hydrolyzable silyl groups into the polymer.

The polyoxyalkylene polymer (A) may be a polymer having a linear main chain structure. However, a polymer having a branched main chain structure may be used as the polyoxyalkylene polymer (A), or a combination of a polymer having a linear main chain structure and a polymer having a branched main chain structure may be used as the polyoxyalkylene polymer (A).

In the first aspect of one or more embodiments of the present invention, the number of the terminal structures per molecule of the polyoxyalkylene polymer (B) is 1.2 or less on average, preferably 1.1 or less on average, and more preferably 1.0 or less on average. The lower limit of the number of the terminal structures per molecule of the polymer (B) is not limited to a particular value, and the number of the terminal structures per molecule of the polymer (B) is preferably 0.5 or more on average, more preferably 0.6 or more on average, and particularly preferably 0.7 or more on average. The main chain structure of the polyoxyalkylene polymer (B) may be linear. The terminal structure of the polymer (B) may be located at only one of the two ends of the linear polymer (B). In the case where the terminal structure is located at only one of the two ends of the linear polymer (B), the number of the terminal structures is up to one per molecule of the polymer (B). In the first aspect, the polymer (B) may be a polymer in which the number of the terminal structures in the molecule is one.

In the second aspect of one or more embodiments of the present invention, the polyoxyalkylene polymer (B) is a polymer in which the number of the terminal structures in the molecule is one. Such a polyoxyalkylene polymer (B) can be produced, for example, by polymerizing an epoxy compound in the presence of an initiator having one hydroxy group in the molecule and then carrying out a one-step or multi-step reaction for introducing hydrolyzable silyl groups into the polymer. The polyoxyalkylene polymer thus obtained contains the initiator-derived structure at one molecular chain end. For example, when butanol is used as the initiator, the resulting polyoxyalkylene polymer contains a butyl group at one molecular chain end. The initiator-derived structure corresponds to the aforementioned terminal group that does not contain any of the hydrolyzable silyl, terminal olefin, and internal olefin groups.

In addition to having the terminal structures including the hydrolyzable silyl groups and further including the terminal olefin groups and/or internal olefin groups, the polyoxyalkylene polymer (A) may or may not have the terminal group that does not contain any of the hydrolyzable silyl, terminal olefin, and internal olefin groups. The polyoxyalkylene polymer (B) has both the terminal structures and the terminal group.

The "hydrolyzable silyl groups" refer to silyl groups that can undergo hydrolysis and dehydration condensation to form a siloxane bond between, and bind to, each other. Due to having the hydrolyzable silyl groups, each of the polyoxyalkylene polymers (A) and (B) exhibits curability based on dehydration condensation reaction. The hydrolyzable silyl groups of the polyoxyalkylene polymer (A) and the hydrolyzable silyl groups of the polyoxyalkylene polymer (B) may be the same or different.

Specifically, the hydrolyzable silyl group can be represented by the following formula (1):

$$-(Si(R^1_{2-b})(Y'_b)O)_m SiR^2_{3-a} Y_a \qquad (1)$$

In the formula (1), $R^1$ and $R^2$ are the same or different and each represent a substituted or unsubstituted monovalent hydrocarbon group having 1 to 20 carbon atoms or a triorganosiloxy group represented by $(R')_3SiO-$; $R'$ represents a substituted or unsubstituted monovalent hydrocarbon group having 1 to 20 carbon atoms, the $R'$ groups being the same or different; Y and Y' are the same or different and each represent a hydroxy group or a hydrolyzable group; a represents 0, 1, 2, or 3; b represents 0, 1, or 2, the letters b optionally representing different numbers when m is 2 or more; m represents an integer of 0 to 19; and a+m×b represents an integer of 1 or more.

The number of carbon atoms in the substituted or unsubstituted monovalent hydrocarbon group having 1 to 20 carbon atoms which is represented by $R^1$ or $R^2$ may be from 1 to 10, from 1 to 8, from 1 to 6, from 1 to 3, or 1 or 2. When the hydrocarbon group has a substituent, the substituent is not limited to a particular species, and examples of the substituent include halogen groups such as a chloro group, alkoxy groups such as a methoxy group, and amino groups such as a N,N-diethylamino group.

$R'$ in the triorganosiloxy group represents a substituted or unsubstituted monovalent hydrocarbon group having 1 to 20 carbon atoms. The number of carbon atoms may be from 1 to 10, from 1 to 8, from 1 to 6, from 1 to 3, or 1 or 2. When the hydrocarbon group has a substituent, the substituent is not limited to a particular species, and examples of the substituent include halogen groups such as a chloro group, alkoxy groups such as a methoxy group, and amino groups such as a N,N-diethylamino group. The three $R'$ groups may be the same or different.

Examples of $R^1$ and $R^2$ include: unsubstituted alkyl groups such as methyl, ethyl, n-propyl, isopropyl, n-butyl, tert-butyl, n-hexyl, 2-ethylhexyl, and n-dodecyl groups; substituted alkyl groups such as chloromethyl, methoxymethyl, and N,N-diethylaminomethyl groups; unsaturated hydrocarbon groups such as vinyl, isopropenyl, and allyl groups; cycloalkyl groups such as a cyclohexyl group; aryl groups such as phenyl, toluyl, and 1-naphthyl groups; aralkyl groups such as a benzyl group; and triorganosiloxy groups represented by $(R')_3SiO-$ wherein $R'$ is, for example, a methyl or phenyl group. Preferred are substituted or unsubstituted alkyl groups, more preferred are methyl, ethyl, chloromethyl, and methoxymethyl groups, even more preferred are methyl and ethyl groups, and particularly preferred is a methyl group. For each of $R^1$ and $R^2$, one group may be used alone, or two or more groups may be used in combination.

Examples of Y and Y' include a hydroxy group, hydrogen, halogens, and alkoxy, acyloxy, ketoximate, amino, amide, acid amide, aminooxy, mercapto, and alkenyloxy groups. Alkoxy and other groups as mentioned above may have a substituent. Alkoxy groups are preferred in terms of moderate hydrolyzability and ease of handling. More preferred are methoxy, ethoxy, n-propoxy, and isopropoxy groups, even more preferred are methoxy and ethoxy groups, and particularly preferred is a methoxy group. For each of Y and Y', one group may be used alone, or two or more groups may be used in combination.

The letter m represents an integer of 0 to 19 as previously stated, and preferably represents 0. When m is 0, the formula (1) can be expressed as the following formula (2).

$$-SiR^2_{3-a} Y_a \qquad (2)$$

In the formula (2), a represents 1, 2, or 3.

Examples of the hydrolyzable silyl group represented by the formula (2) include trimethoxysilyl, triethoxysilyl, tris (2-propenyloxy)silyl, triacetoxysilyl, methyldimethoxysilyl, methyldiethoxysilyl, dimethoxyethylsilyl, (chloromethyl) dimethoxysilyl, (chloromethyl)diethoxysilyl, (methoxymethyl)dimethoxysilyl, (methoxymethyl)diethoxysilyl, (N,N-diethylaminomethyl)dimethoxysilyl, and (N,N-diethylaminomethyl)diethoxysilyl groups. Among these, methyldimethoxysilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups are preferred because they have high reactivity and their use can lead to obtaining a cured product having good mechanical properties. In terms of reactivity, trimethoxysilyl, (chloromethyl)dimethoxysilyl, and (methoxymethyl)dimethoxysilyl groups are more preferred. In terms of stability, methyldimethoxysilyl, methyldiethoxysilyl, and triethoxysilyl groups are more preferred, and methyldiethoxysilyl and triethoxysilyl groups are even more preferred. Trimethoxysilyl, triethoxysilyl, and methyldimethoxysilyl groups are more preferred in terms of ease of production. A methyldimethoxysilyl group is the most preferred among the aforementioned groups.

In the formula (2), a may represent 2 in order to ensure the storage stability and reactivity of the polymer and at the same time ensure the flexibility of the cured product. When a is 2, the formula (2) can be expressed as the following formula (3).

$$-SiR^2 Y_2 \qquad (3)$$

In this formula, $R^2$ and Y are as defined above. Two or more kinds of hydrolyzable silyl groups represented by the formula (1) or (2) and having different values of a may be used in combination.

The "terminal olefin group" refers to a carbon-carbon double bond containing a methylidene group ($H_2C=$). Specifically, the terminal olefin group can be represented by the following formula (4).

$$H_2C=C(R^3)-CH_2- \qquad (4)$$

In the formula (4), $R^3$ represents hydrogen, a substituted or unsubstituted alkyl group having 1 to 10 carbon atoms, a substituted or unsubstituted aryl group having 6 to 10 carbon atoms, or a substituted or unsubstituted aralkyl group having 7 to 10 carbon atoms. The number of carbon atoms in the alkyl group may be from 1 to 8, from 1 to 6, from 1 to 3, or 1 or 2. The number of carbon atoms in the aryl group may be from 6 to 8 or 6 or 7. The number of carbon atoms in the aralkyl group may be 7 or 8. When the alkyl, aryl, or aralkyl group has a substituent, the substituent is not limited to a particular species, and examples of the substituent include halogen groups such as a chloro group, alkoxy groups such as a methoxy group, and amino groups such as a N,N-diethylamino group.

Examples of $R^3$ include hydrogen, alkyl groups such as methyl, ethyl, propyl, and butyl groups, aryl groups such as a phenyl group, and aralkyl groups such as a benzyl group. In particular, $R^3$ may be hydrogen or an alkyl group, or hydrogen, a methyl group, or an ethyl group, or hydrogen or a methyl group. The $R^3$ groups in the polymer may be the same or different.

The "internal olefin group" refers to a carbon-carbon double bond containing no methylidene group ($H_2C=$). Specifically, the internal olefin group can be represented by the following formula (5).

$$H_3C-C(R^3)=CH- \quad (5)$$

In the formula (5), $R^3$ typically represents the same group as $R^3$ in the formula (4), but may represent a group different from $R^3$ in the formula (4) insofar as the group falls within the definition of $R^3$. The $R^3$ groups in the polymer may be the same or different.

As described later, the internal olefin group is a group that can be generated by an internal rearrangement reaction of the terminal olefin group. When the terminal olefin group is an allyl group ($R^3=H$), the internal olefin group generated by the internal rearrangement reaction of the terminal olefin group is a 1-propenyl group.

Each of the polyoxyalkylene polymers (A) and (B) has the hydrolyzable silyl groups and the terminal and/or internal olefin groups in its terminal structures. In each of the polyoxyalkylene polymers (A) and (B), the total number of the hydrolyzable silyl, terminal olefin, and internal olefin groups in the terminal structures is more than 1.0 on average per terminal structure. As such, a cured product of the mixture of the polyoxyalkylene polymers (A) and (B) can exhibit lower modulus than a cured product of another polyoxyalkylene polymer in which the total number is 1.0 or less on average per terminal structure when the amount of the introduced hydrolyzable silyl groups in the mixture of the polyoxyalkylene polymers (A) and (B) is the same as that in the other polyoxyalkylene polymer. The total number in each of the polyoxyalkylene polymers (A) and (B) may be 1.1 or more, 1.3 or more, 1.5 or more, or 2.0 or more. Further, the total number may be more than 2.0 or 2.5 or more. The upper limit of the total number is not limited to a particular value. The total number may be 10 or less, 8 or less, 6 or less, or 5 or less. The total number in the polyoxyalkylene polymer (A) and the total number in the polyoxyalkylene polymer (B) may be the same or different.

The total number of the hydrolyzable silyl, terminal olefin, and internal olefin groups per terminal structure can be determined as appropriate by those skilled in the art. For example, when, as described later, the polyoxyalkylene polymer (A) or (B) or the mixture of the polymers (A) and (B) is produced by a method in which a hydroxy-terminated polyoxyalkylene polymer (E) is reacted with a terminal olefin group-containing epoxy compound and then with a terminal olefin group-containing organic halide, the total number can be calculated by adding 1 (the number of olefin groups introduced from the organic halide) to the equivalents of the epoxy compound relative to the hydroxy groups of the hydroxy-terminated polyoxyalkylene polymer (E) (the number of olefin groups introduced from the epoxy compound). Alternatively, the total number can be determined by $^1H$ NMR of the polyoxyalkylene polymer (A) and/or polyoxyalkylene polymer (B) of one or more embodiments of the present invention or their precursor intermediates or by titrimetric analysis of the iodine value or hydroxyl value of the polyoxyalkylene polymer (A) and/or polyoxyalkylene polymer (B) or their precursor intermediates.

In one or more embodiments of the present invention, the percentage of the hydrolyzable silyl groups to the total of the hydrolyzable silyl, terminal olefin, and internal olefin groups in the whole mixture of the polyoxyalkylene polymers (A) and (B) is set relatively low. This allows the mixture to be formed into a cured product able to exhibit low modulus and at the same time high recovery performance. Specifically, in the whole mixture of the polyoxyalkylene polymers (A) and (B), the percentage of the number of moles of the hydrolyzable silyl groups to the total number of moles of the hydrolyzable silyl, terminal olefin, and internal olefin groups is from 40 to 75% on average. Controlling the percentage in the range of 40 to 75% can ensure that a cured product containing the mixture of the polyoxyalkylene polymers (A) and (B) of one or more embodiments of the present invention exhibits both low modulus and high recovery performance.

The above percentage in the whole mixture of the polymers (A) and (B) may be 74% or less, 72% or less, 70% or less, 65% or less, or 59% or less in order to further reduce the modulus of the cured product. The percentage in the whole mixture of the polymers (A) and (B) may be 50% or more, 55% or more, 60% or more, or 65% or more in order to further improve the recovery performance of the cured product. In order to ensure both the desired modulus and recovery performance of the cured product, the percentage in the whole mixture of the polymers (A) and (B) may be in the range of 55 to 70%.

Furthermore, in each of the polyoxyalkylene polymers (A) and (B), the percentage of the number of moles of the hydrolyzable silyl groups to the total number of moles of the hydrolyzable silyl, terminal olefin, and internal olefin groups may be from 30 to 80% on average. The percentage in each of the polymers (A) and (B) may be 75% or less, 70% or less, 65% or less, or 60% or less. The percentage in each of the polymers (A) and (B) may be 35% or more, 40% or more, 45% or more, or 50% or more. The percentage in the polyoxyalkylene polymer (A) and the percentage in the polyoxyalkylene polymer (B) may be the same or different.

The "percentage of the number of moles of the hydrolyzable silyl groups to the total number of moles of the hydrolyzable silyl, terminal olefin, and internal olefin groups" can be referred to also as the "degree of hydrolyzable silyl group introduction".

The percentage of the number of moles of the hydrolyzable silyl groups to the total number of moles of the hydrolyzable silyl, terminal olefin, and internal olefin groups can be determined by $^1H$ NMR. For example, when the terminal olefin groups are allyl groups and the hydrolyzable silyl groups are introduced into the terminal structures, as described later, by a hydrosilylation reaction with a hydrolyzable silyl group-containing hydrosilane compound, the percentage can be calculated by using the integrals of the signals listed below.

Hydrolyzable silyl groups: $CH_2$ bonded to silyl group (signal at around 0.6 ppm, 2H)

Terminal olefin groups: $CH_2$ of methylidene group (signal at around 5.2 ppm, 2H)

Internal olefin groups: CH bonded to terminal $CH_3$ group (the sum of signals at around 4.3 ppm and around 4.8 ppm, 1H)

If other signals overlap the above signals, the integrals of the other signals are excluded from the calculation.

The mixture of the polyoxyalkylene polymers (A) and (B) has the hydrolyzable silyl groups to the extent that both the total number of the hydrolyzable silyl, terminal olefin, and internal olefin groups and the percentage of the number of moles of the hydrolyzable silyl groups to the total number of moles of the hydrolyzable silyl, terminal olefin, and internal olefin groups meet the requirements described above. In the whole mixture, the number of the hydrolyzable silyl groups may be 0.7 or more, 0.9 or more, 1.0 or more, 1.2 or more, 1.4 or more, or 1.5 or more on average per terminal structure. In this case, the mixture of the polyoxyalkylene polymers (A) and (B) can exhibit good curability. The upper limit of the number of the hydrolyzable silyl groups is not limited to a particular value. The number of the hydrolyzable silyl groups may be 10 or less, 5 or less, 3 or less, or 2.5 or less on average per terminal structure.

The number of the hydrolyzable silyl groups per terminal structure can be calculated by multiplying the above-described "total number of the hydrolyzable silyl, terminal olefin, and internal olefin groups per terminal structure" by the above-described "percentage of the number of moles of the hydrolyzable silyl groups to the total number of moles of the hydrolyzable silyl, terminal olefin, and internal olefin groups."

The terminal structures of the polyoxyalkylene polymers (A) and (B), which include the hydrolyzable silyl groups and further include the terminal olefin groups and/or the internal olefin groups, are not limited to particular structures. An example of the terminal structure having the hydrolyzable silyl group and the terminal olefin group is a structure represented by the following formula (6).

[Chem 1]

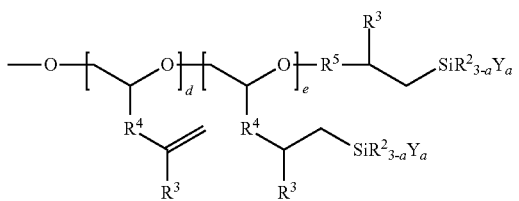

(6)

Another example is a structure represented by the following formula (7).

[Chem 2]

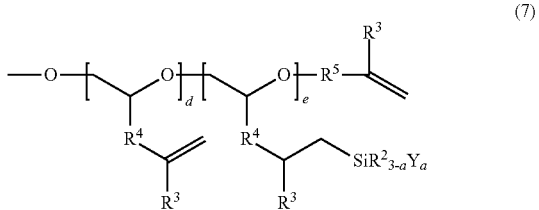

(7)

In the formulae (6) and (7), the leftmost oxygen atom represents oxygen present in the oxyalkylene unit located at an end of the polyoxyalkylene main chain structure. While in the formulae (6) and (7) the hydrolyzable silyl group is one represented by the formula (2), one or more embodiments of the present invention are not limited to such structures.

In the formulae (6) and (7), d and e each represent an integer of 0 or more, and the sum of d and e is more than 0 on average per terminal structure. The sum of d and e may be 0.1 or more, 0.3 or more, 0.5 or more, or 1.0 or more. The sum of d and e may be more than 1.0 or 1.5 or more. The sum of d and e may be 9 or less, 7 or less, 5 or less, or 4 or less.

$R^2$ and $R^3$ are as defined above. The $R^2$ or $R^3$ groups in each formula may be the same or different.

In the formulae (6) and (7), $R^4$ represents a direct bond or a divalent organic group having 1 to 6 carbon atoms and optionally an oxygen atom. The number of carbon atoms in the organic group may be from 1 to 4, 1 or 2, or 2. $R^4$ may be a divalent organic group having 1 to 6 carbon atoms and optionally an oxygen atom, or $-CH_2-$, $-CH_2O-$, $-CH_2OCH_2-$, or $-C(=O)-O-CH_2-$, or $-CH_2OCH_2-$. The $R^4$ groups may be the same or different.

In the formulae (6) and (7), $R^5$ represents a direct bond or a divalent organic group having 1 to 6 carbon atoms and optionally an oxygen atom. The number of carbon atoms in the organic group may be from 1 to 4, 1 or 2, or 1. $R^5$ may be a direct bond or a divalent hydrocarbon group having 1 to 6 carbon atoms, a direct bond, $-CH_2-$, or $-CH_2CH_2-$, a direct bond or $-CH_2-$, or $-CH_2-$.

The terminal structure represented by the formula (6) has (e+1) hydrolyzable silyl groups and d terminal olefin groups. The terminal structure represented by the formula (7) has e hydrolyzable silyl groups and (d+1) terminal olefin groups. The d terminal olefin group-containing units and the e hydrolyzable silyl group-containing units shown in the formula (6) or (7) correspond to moieties derived from a terminal olefin group-containing epoxy compound described later.

The terminal structure represented by the formula (6) or (7) is one terminal structure bonded to one end of the main chain structure. Although a plurality of hydrolyzable silyl groups and/or terminal olefin groups are shown in the formulae (6) and (7), each of the formulae (6) and (7) does not represent two or more terminal structures but one terminal structure and indicates that the one terminal structure has the plurality of hydrolyzable silyl groups and/or terminal olefin groups. In the formula (6) or (7), the oxyalkylene repeating units constituting the main chain structure are not shown. That is, the d or e bracketed structures in the formula (6) or (7) do not correspond to the oxyalkylene repeating units constituting the main chain structure.

These formulae are merely examples for illustrative purposes, and the terminal structures in one or more embodiments of the present invention are not limited to the chemical structures of the formulae. The terminal olefin group present in the formula (6) or (7) may be an internal olefin group. In particular, at least one of the terminal olefin groups may be an internal olefin group. The order in which the d terminal olefin group-containing units and the e hydrolyzable silyl group-containing units are bonded is not limited to those shown in the formulae (6) and (7). The structural formula of the terminal structures included in the polyoxyalkylene polymers (A) and (B) is not limited to one specific formula. Typically, terminal structures represented by different structural formulae are present together. The terminal structure represented by the formula (6) and the terminal structure represented by the formula (7) may be present together. The terminal structures of the polyoxyalkylene polymer (A) and the terminal structures of the polyoxyalkylene polymer (B) may be the same or different.

The ratio between the polyoxyalkylene polymers (A) and (B) in the mixture of one or more embodiments of the present invention is not limited to a particular range. The (A):(B) weight ratio may be from 95:5 to 20:80, from 90:10 to 30:70, from 80:20 to 40:60, or from 75:25 to 50:50. For each of the polyoxyalkylene polymers (A) and (B) of one or more embodiments of the present invention, one polyoxyalkylene polymer may be used alone, or two or more polyoxyalkylene polymers may be used in combination.

The number-average molecular weight of each of the polyoxyalkylene polymers (A) and (B) is not limited to a particular range. In order to ensure both desired production cost and polymer workability, the polystyrene-equivalent number-average molecular weight as determined by GPC may be from 3,000 to 100,000, from 3,000 to 50,000, or from 3,000 to 30,000.

Each of the polyoxyalkylene polymers (A) and (B) is not limited to having a particular molecular weight distribution (Mw/Mn) but may have a narrow molecular weight distribution. To be specific, Mw/Mn may be less than 2.0, 1.6 or less, 1.5 or less, or 1.4 or less. Mw/Mn may be 1.2 or less in terms of improving the various mechanical properties such as increasing the durability and elongation of the cured product. The molecular weight distribution (Mw/Mn) can be calculated from the number-average molecular weight and weight-average molecular weight determined by GPC analysis.

The modulus at 100% elongation (100% modulus) of a cured product of the mixture of the polyoxyalkylene polymers (A) and (B) may be 0.30 MPa or less, 0.25 MPa or less, or 0.20 MPa or less in order to ensure the flexibility of a cured product of a curable composition containing the mixture of the polyoxyalkylene polymers (A) and (B). To ensure the mechanical properties of the cured product of the curable composition, the modulus at 100% elongation of the cured product of the mixture may be 0.10 MPa or more, 0.12 MPa or more, or 0.15 MPa or more. The modulus at 100% elongation of the cured product of the mixture is defined as a value measured under the conditions described hereinafter.

<Method of Measuring Modulus at 100% Elongation of Cured Product of Mixture>

A 3-mm-thick sheet-shaped mold is charged with a mixture of the polymers (A) and (B), tin(II) octylate, laurylamine, and distilled water (polymers (A) and (B)/tin(II) octylate/laurylamine/distilled water weight ratio=40/1.2/0.2/0.24). The mixture in the mold is stored at a temperature of 23° C. and a relative humidity of 50% for 1 hour or more and subsequently aged in a dryer at 70° C. for 20 hours to obtain a sheet-shaped cured product.

The cured product obtained is punched to prepare a No. 3 dumbbell-shaped specimen according to JIS K 6251. The specimen prepared is subjected to tensile testing (tensile speed=200 mm/min) performed using Autograph at a temperature of 23° C. and a relative humidity of 50%, and the modulus at 100% elongation of the specimen is measured.

<Method of Producing Polyoxyalkylene Polymer (A) or (B) or Mixture of Polymers (A) and (B)>

Hereinafter, a method of producing the polyoxyalkylene polymer (A) or (B) or a mixture of the polymers (A) and (B) will be described. In production of the mixture, the polyoxyalkylene polymers (A) and (B) may be synthesized separately and then mixed, or the polyoxyalkylene polymers (A) and (B) may be synthesized together in a single system.

The polyoxyalkylene polymer (A) or (B) or the mixture of the polyoxyalkylene polymers (A) and (B) synthesized together in a single system can be produced as follows: terminal olefin groups are introduced into a hydroxy-terminated polyoxyalkylene polymer (E) by making use of the reactivity of the hydroxy groups, with the number of the terminal olefin groups being more than 1.0 on average per terminal structure; and then the polymer is reacted with a hydrolyzable silyl group-containing compound reactive with the terminal olefin groups to introduce hydrolyzable silyl groups into the polymer.

Hereinafter, the method of producing the polyoxyalkylene polymer (A) or (B) or the mixture of the polymers (A) and (B) will be described in detail, although the method is not limited to the details described below. First, the hydroxy-terminated polyoxyalkylene polymer (E) is reacted with a terminal olefin group-containing epoxy compound (8) and further with a terminal olefin group-containing organic halide (10) to introduce terminal olefin groups into the polymer, with the number of the introduced terminal olefin groups being more than 1.0 on average per terminal structure of the polymer. Next, the terminal olefin groups are subjected to a hydrosilylation reaction with a hydrolyzable silyl group-containing hydrosilane compound (12) to introduce hydrolyzable silyl groups into the terminal structures and thereby give the polyoxyalkylene polymer (A) or (B) or the mixture of the polymers (A) and (B). The reactions of the polymer terminal structures in the above production method can be represented, for example, by the reaction formula given below. In the formula, X represents a halogen and M represents an alkali metal.

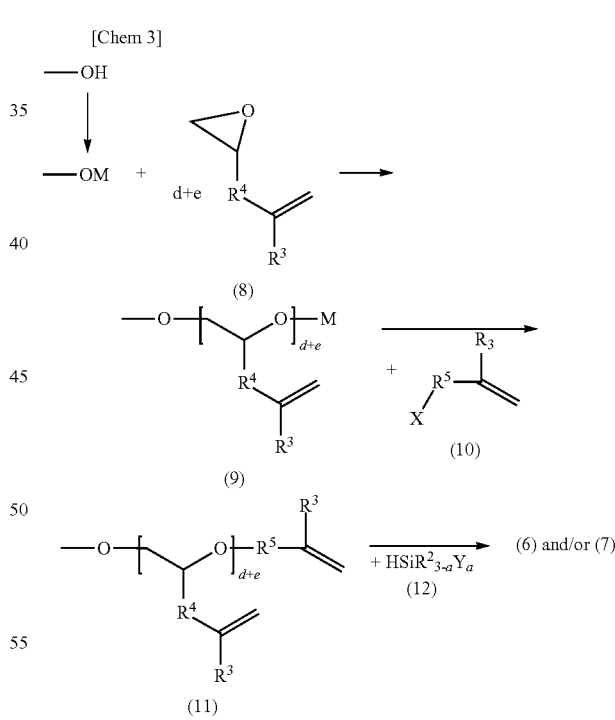

In one or more embodiments of the present invention, when the hydrolyzable silyl groups are introduced, not all the reactive terminal olefin groups are reacted with the hydrosilane compound, but instead the degree of reaction is controlled to allow some of the terminal olefin groups to remain unreacted. As a result, the polyoxyalkylene polymer (A) or (B) or the mixture of the polymers (A) and (B) can be obtained in which the percentage of the number of moles of the hydrolyzable silyl groups to the total number of moles of the hydrolyzable silyl, terminal olefin, and internal olefin groups falls within the range of 40 to 75%.

The internal olefin groups can be formed by an internal rearrangement reaction (isomerization) of the terminal olefin groups which occurs as a side reaction during the hydrosilylation reaction. The formed internal olefin groups have low hydrosilylation activity and thus remain in the polyoxyalkylene polymer (A) and/or (B) without reacting with the hydrosilane compound during the hydrosilylation reaction.

Hereinafter, an embodiment of the method of producing the polyoxyalkylene polymer (A) or (B) or the mixture of the polymers (A) and (B) will be described in detail, although the method of producing the polyoxyalkylene polymer (A) or (B) or the mixture of the polymers (A) and (B) is not limited to the embodiment described below.

(Polymerization)

The main chain structure of the polyoxyalkylene polymer can be formed by polymerizing an epoxy compound with a hydroxy group-containing initiator using a conventionally known method. This polymerization can yield the hydroxy-terminated polyoxyalkylene polymer (E). The method of polymerization is not limited to a particular technique. A polymerization method using a double metal cyanide complex catalyst such as a zinc hexacyanocobaltate-glyme complex is preferred because this method can yield a hydroxy-terminated polymer having a narrow molecular weight distribution (small value of Mw/Mn).

Examples of the hydroxy group-containing initiator include, but are not limited to, organic compounds having one or more hydroxy groups such as ethylene glycol, propylene glycol, glycerin, pentaerythritol, low-molecular-weight polyoxypropylene glycol, low-molecular-weight polyoxypropylene triol, butanol, allyl alcohol, low-molecular-weight polyoxypropylene monoallyl ether, and low-molecular-weight polyoxypropylene monoalkyl ether.

In the first aspect of one or more embodiments of the present invention, a mixture of an initiator having 1.5 or more hydroxy groups on average per molecule and an initiator having 1.2 or less hydroxy groups on average per molecule is used as the hydroxy group-containing initiator, and an epoxy compound is polymerized in the presence of the initiator mixture to form main chain structures. Thus, the hydroxy-terminated polyoxyalkylene polymer (E) can be obtained as a mixture of two kinds of polymers. The polymer (E) is subjected to the terminal olefin group introduction step and hydrolyzable silyl group introduction step described later to form terminal structures. In this manner, the mixture of the polymers (A) and (B) according to the first aspect of one or more embodiments of the present invention can be synthesized in a single system. The initiator having 1.5 or more hydroxy groups on average per molecule may be an initiator having two or more hydroxy groups in the molecule or an initiator having two hydroxy groups in the molecule. The initiator having 1.2 or less hydroxy groups on average per molecule may be an initiator having one hydroxy group in the molecule.

In the second aspect of one or more embodiments of the present invention, a mixture of an initiator having two or more hydroxy groups in the molecule and an initiator having one hydroxy group in the molecule is used as the hydroxy group-containing initiator, and an epoxy compound is polymerized in the presence of the initiator mixture to form main chain structures. Thus, the hydroxy-terminated polyoxyalkylene polymer (E) can be obtained as a mixture of two kinds of polymers. The initiator having two or more hydroxy groups in the molecule may be an initiator having two hydroxy groups in the molecule. For example, when a mixture of an initiator having two hydroxy groups in the molecule and an initiator such as butanol which has one hydroxy group in the molecule is used, the resulting hydroxy-terminated polyoxyalkylene polymer (E) is a mixture of a polyoxyalkylene polymer having hydroxy groups at both ends and a polyoxyalkylene polymer having a hydroxy group at one end. After the polymerization, the terminal olefin group introduction step and hydrolyzable silyl group introduction step described later are carried out to form terminal structures. In this manner, the mixture of the polymers (A) and (B) according to the second aspect of one or more embodiments of the present invention can be synthesized in a single system.

When an organic compound having two or more hydroxy groups is used alone as the hydroxy group-containing initiator, the polymer (A) can be synthesized, while when an organic compound having one hydroxy group is used alone as the hydroxy group-containing initiator, the polymer (B) can be synthesized.

Examples of the epoxy compound include, but are not limited to, alkylene oxides such as ethylene oxide and propylene oxide and glycidyl ethers such as methyl glycidyl ether and butyl glycidyl ether. Preferred is propylene oxide.

(Introduction of Terminal Olefin Groups)

A preferred method of introducing more than 1.0 terminal olefin groups on average per terminal structure is one in which an alkali metal salt is allowed to act on the hydroxy-terminated polyoxyalkylene polymer (E) to convert the terminal hydroxy groups to alkoxide groups and subsequently the resulting polymer is reacted first with the terminal olefin group-containing epoxy compound (8) and then with the terminal olefin group-containing organic halide (10). A double metal cyanide complex catalyst may be used instead of the alkali metal salt.

Examples of the alkali metal salt include, but are not limited to, sodium hydroxide, sodium alkoxides, potassium hydroxide, potassium alkoxides, lithium hydroxide, lithium alkoxides, cesium hydroxide, and cesium alkoxides. In terms of ease of handling and solubility, sodium hydroxide, sodium methoxide, sodium ethoxide, potassium hydroxide, potassium methoxide, and potassium ethoxide are preferred, and sodium methoxide and potassium methoxide are more preferred. In terms of availability, sodium methoxide is particularly preferred. A solution of the alkali metal salt in a solvent may be used in the reaction.

The amount of the alkali metal salt used is not limited to a particular range. The molar ratio of the alkali metal salt to the hydroxy groups of the hydroxy-terminated polyoxyalkylene polymer (E) may be 0.5 or more, 0.6 or more, 0.7 or more, or 0.8 or more. The molar ratio may be 1.2 or less or 1.1 or less.

The purpose of the use of the alkali metal salt is to convert the hydroxy groups of the hydroxy-terminated polyoxyalkylene polymer (E) to alkoxide groups. To allow this conversion reaction to proceed efficiently, water and any hydroxy group-containing material other than the polyoxyalkylene polymer may be removed beforehand from the reaction system. This removal can be accomplished using a conventionally known method, examples of which include evaporation by heating, devolatilization under reduced pressure, spray vaporization, thin-film evaporation, and azeotropic devolatilization.

The temperature at which the alkali metal salt is allowed to act on the polymer can be chosen as appropriate by those skilled in the art. The temperature may be from 50 to 150° C. or from 110 to 145° C. The time for which the alkali metal salt is allowed to act on the polymer may be from 10 minutes to 5 hours or from 30 minutes to 3 hours.

The polyoxyalkylene polymer is then subjected to a ring-opening addition reaction with the terminal olefin group-containing epoxy compound (8) to form terminal structures (9) including moieties derived from the terminal olefin group-containing epoxy compound.

The terminal olefin group-containing epoxy compound can be represented by, but is not limited to, the chemical formula (8) shown in the above reaction formula. Specific examples of the epoxy compound include allyl glycidyl ether, methallyl glycidyl ether, glycidyl acrylate, glycidyl methacrylate, butadiene monoxide, and 1,4-cyclopentadiene monoepoxide. Allyl glycidyl ether is particularly preferred.

The amount of the terminal olefin group-containing epoxy compound (8) used is not limited to a particular range, and can be chosen as appropriate in consideration of the total number of the hydrolyzable silyl, terminal olefin, and internal olefin groups to be included in the intended terminal structures and in consideration of the reactivity of the epoxy compound used. To be specific, the molar ratio of the epoxy compound (8) used to the hydroxy groups of the hydroxy-terminated polyoxyalkylene polymer (E) may be 0.1 or more, 0.3 or more, 0.5 or more, or 1.0 or more. The molar ratio may be more than 1.0 or 1.5 or more. The molar ratio may be 9 or less, 7 or less, 5 or less, or 4 or less.

The temperature of the ring-opening addition reaction with the terminal olefin group-containing epoxy compound (8) can be chosen as appropriate by those skilled in the art. The reaction temperature may be from 60 to 150° C. or from 110 to 145° C. The reaction time may be from 10 minutes to 5 hours or from 1 to 4 hours.

The polyoxyalkylene polymer having the terminal structures (9) including the moieties derived from the terminal olefin group-epoxy compound is then reacted with the terminal olefin group-containing organic halide (10) to form ether bonds through a halogen substitution reaction and thus convert the terminal alkoxide groups of the polymer to the terminal olefin groups. This results in the formation of terminal structures (11) including the terminal olefin groups the number of which is more than 1.0 on average per terminal structure.

The terminal olefin group-containing organic halide can be represented by, but is not limited to, the chemical formula (10) shown in the above reaction formula. Specific examples of the organic halide include vinyl chloride, allyl chloride, methallyl chloride, vinyl bromide, allyl bromide, methallyl bromide, vinyl iodide, allyl iodide, and methallyl iodide. Allyl chloride and methallyl chloride are preferred in terms of ease of handling.

The amount of the terminal olefin group-containing organic halide (10) used is not limited to a particular range. The molar ratio of the terminal olefin group-containing organic halide (10) to the hydroxy groups of the hydroxy-terminated polyoxyalkylene polymer (E) may be 0.7 or more or 1.0 or more. The molar ratio may be 5.0 or less or 2.0 or less.

The temperature of the reaction with the terminal olefin group-containing organic halide (10) can be chosen as appropriate by those skilled in the art. The reaction temperature may be from 50 to 150° C. or from 110 to 140° C. The reaction time may be from 10 minutes to 5 hours or from 20 minutes to 2 hours.

(Introduction of Hydrolyzable Silyl Groups)

The polyoxyalkylene polymer obtained as above, which has the terminal structures (11) including the terminal olefin groups the number of which is more than 1.0 on average per terminal structure, is subjected to a hydrosilylation reaction with the hydrolyzable silyl group-containing hydrosilane compound (12) to introduce the hydrolyzable silyl groups into some of the terminal olefin groups. The rest of the terminal olefin groups are allowed to remain in the polymer without reacting with the hydrosilane compound (12). During the hydrosilylation reaction, as previously stated, some of the terminal olefin groups can be isomerized into the internal olefin groups by a side reaction. The above processes can yield the polyoxyalkylene polymer (A) or (B), or the mixture of the polymers (A) and (B), which has the terminal structures (6) and/or (7) including the hydrolyzable silyl groups and further including the terminal olefin groups and/or internal olefin groups. The hydrosilylation reaction is advantageous in that it can be easily performed, enables easy adjustment of the amount of the hydrolyzable silyl groups to be introduced, and allows the resulting polymer to have stable physical properties.

The hydrolyzable silyl group-containing hydrosilane compound can be represented by, but is not limited to, the chemical formula (12) shown in the above reaction formula. Specific examples of the hydrosilane compound include: halogenated silanes such as trichlorosilane, dichloromethylsilane, chlorodimethylsilane, dichlorophenylsilane, (chloromethyl)dichlorosilane, (dichloromethyl)dichlorosilane, bis(chloromethyl)chlorosilane, (methoxymethyl)dichlorosilane, (dimethoxymethyl)dichlorosilane, and bis(methoxymethyl)chlorosilane; alkoxy silanes such as trimethoxysilane, triethoxysilane, dimethoxymethylsilane, diethoxymethylsilane, dimethoxyphenylsilane, ethyldimethoxysilane, methoxydimethylsilane, ethoxydimethylsilane, (chloromethyl)methylmethoxysilane, (chloromethyl)dimethoxysilane, (chloromethyl)diethoxysilane, bis(chloromethyl)methoxysilane, (methoxymethyl)methylmethoxysilane, (methoxymethyl)dimethoxysilane, bis(methoxymethyl)methoxysilane, (methoxymethyl)diethoxysilane, (ethoxymethyl)diethoxysilane, (3,3,3-trifluoropropyl)dimethoxysilane, (N,N-diethylaminomethyl)dimethoxysilane, (N,N-diethylaminomethyl)diethoxysilane, [(chloromethyl)dimethoxysilyloxy]dimethylsilane, [(chloromethyl)diethoxysilyloxy]dimethylsilane, [(methoxymethyl)dimethoxysilyloxy]dimethylsilane, [(methoxymethyl)diethoxysilyloxy]dimethylsilane, [(diethylaminomethyl)dimethoxysilyloxy]dimethylsilane, and [(3,3,3-trifluoropropyl)dimethoxysilyloxy]dimethylsilane; acyloxy silanes such as diacetoxymethylsilane and diacetoxyphenylsilane; ketoximatosilanes such as bis(dimethylketoximato)methylsilane and bis(cyclohexylketoximato)methylsilane; and isopropenyloxy silanes (deacetonated type) such as triisopropenyloxysilane, (chloromethyl)diisopropenyloxysilane, and (methoxymethyl)diisopropenyloxysilane.

The amount of the hydrolyzable silyl group-containing hydrosilane compound (12) used is such that the percentage of the number of moles of the hydrolyzable silyl groups to the total number of moles of the hydrolyzable silyl, terminal olefin, and internal olefin groups falls within the range of 40 to 75%, and can be chosen as appropriate in consideration of the amount of the terminal olefin groups of the polyoxyalkylene polymer that has yet to undergo the hydrosilylation reaction. To be specific, the molar ratio of the hydrosilane compound to the terminal olefin groups of the polyoxyalkylene polymer that has yet to undergo the hydrosilylation reaction may be from 40 to 75%.

The hydrosilylation reaction may be carried out in the presence of a hydrosilylation catalyst to accelerate the reaction. Known examples of the hydrosilylation catalyst include metals such as cobalt, nickel, iridium, platinum, palladium, rhodium, and ruthenium and complexes of these metals, and any of these can be used in the hydrosilylation reaction. Specific examples of the catalyst include: platinum supported on a support such as alumina, silica, or carbon black; chloroplatinic acid; a chloroplatinic acid complex composed of chloroplatinic acid and another compound such as an alcohol, an aldehyde, or a ketone; platinum-olefin complexes such as $Pt(CH_2=CH_2)_2(PPh_3)$ and $Pt(CH_2=CH_2)_2Cl_2$; platinum-vinylsiloxane complexes such as $Pt\{(vinyl)Me_2SiOSiMe_2(vinyl)\}$ and $Pt\{Me(vinyl)SiO\}_4$; platinum-phosphine complexes such as $Pt(PPh_3)_4$ and $Pt(PBu_3)_4$; and platinum-phosphite complexes such as $Pt\{P(OPh)_3\}_4$. Platinum catalysts such as chloroplatinic acid and platinum-vinylsiloxane complexes are preferred in terms of reaction efficiency.

The hydrosilylation reaction is not limited to a particular temperature condition, and the temperature condition of the reaction can be chosen as appropriate by those skilled in the art. In order to reduce the viscosity of the reaction system or increase the reactivity, the reaction may be conducted under heating. To be specific, the reaction may be conducted at 50 to 150° C. or conducted at 70 to 120° C. The reaction time can also be chosen as appropriate. The reaction time may be adjusted along with the temperature condition to prevent the occurrence of an unintended condensation reaction of the polymer. To be specific, the reaction time may be from 30 minutes to 5 hours or 3 hours or less.

The hydrosilylation reaction may be conducted in the presence of a trialkyl orthocarboxylate. In this case, viscosity increase during the hydrosilylation reaction can be reduced, and the storage stability of the resulting polymer can be improved.

Examples of the trialkyl orthocarboxylate include trimethyl orthoformate, triethyl orthoformate, trimethyl orthoacetate, and triethyl orthoacetate. Preferred are trimethyl orthoformate and trimethyl orthoacetate.

When a trialkyl orthocarboxylate is used, the amount of the trialkyl orthocarboxylate is not limited to a particular range but preferably from about 0.1 to 10 parts by weight and more preferably from about 0.1 to 3 parts by weight per 100 parts by weight of the polyoxyalkylene polymer (A) or (B) or the mixture of the polymers (A) and (B).

<Curable Composition>

One or more embodiments of the present invention can provide a curable composition containing the mixture of the polyoxyalkylene polymers (A) and (B).

(Silanol Condensation Catalyst)

The curable composition of one or more embodiments of the present invention may contain a silanol condensation catalyst for the purpose of accelerating the hydrolysis and condensation reaction of the hydrolyzable silyl groups of the polyoxyalkylene polymers (A) and (B), i.e., the curing reaction of the polyoxyalkylene polymers (A) and (B).

The silanol condensation catalyst used can be a conventionally known catalyst. Specifically, for example, an organotin compound, a metal carboxylate, an amine compound, a carboxylic acid, an alkoxy metal, or an inorganic acid can be used as the silanol condensation catalyst.

Specific examples of the organotin compound include dibutyltin dilaurate, dibutyltin dioctanoate, dibutyltin bis(butyl maleate), dibutyltin diacetate, dibutyltin oxide, dibutyltin bis(acetylacetonate), a reaction product of dibutyltin oxide and a silicate compound, a reaction product of dibutyltin oxide and a phthalic ester, dioctyltin diacetate, dioctyltin dilaurate, dioctyltin bis(ethyl maleate), dioctyltin bis(octyl maleate), dioctyltin bis(acetylacetonate), and a reaction product of dioctyltin oxide and a silicate compound. Dioctyltin compounds are preferred in view of the recent increased awareness of environmental issues.

Specific examples of the metal carboxylate include tin carboxylate, bismuth carboxylate, titanium carboxylate, zirconium carboxylate, and iron carboxylate. The metal carboxylate may be a combination of any of the carboxylic acids mentioned below and any of various metals.

Specific examples of the amine compound include: amines such as octylamine, 2-ethylhexylamine, laurylamine, and stearylamine; nitrogen-containing heterocyclic compounds such as pyridine, 1,8-diazabicyclo[5,4,0]undec-7-ene (DBU), and 1,5-diazabicyclo[4,3,0]non-5-ene (DBN); guanidines such as guanidine, phenylguanidine, and diphenylguanidine; biguanides such as butylbiguanide, 1-o-tolylbiguanide, and 1-phenylbiguanide; amino group-containing silane coupling agents; and ketimine compounds.

Specific examples of the carboxylic acid include acetic acid, propionic acid, butyric acid, 2-ethylhexanoic acid, lauric acid, stearic acid, oleic acid, linoleic acid, neodecanoic acid, and versatic acid.

Specific examples of the alkoxy metal include: titanium compounds such as tetrabutyl titanate, titanium tetrakis (acetylacetonate), and diisopropoxytitanium bis(ethyl acetoacetate); aluminum compounds such as aluminum tris (acetylacetonate) and diisopropoxyaluminum ethyl acetoacetate; and zirconium compounds such as zirconium tetrakis (acetylacetonate).

Examples of other silanol condensation catalysts which can be used include fluorine anion-containing compounds, photoacid generators, and photobase generators.

Two or more different silanol condensation catalysts may be used in combination. For example, a combined use of the amine compound and carboxylic acid as mentioned above can be expected to provide a reactivity-enhancing effect.

The content of the silanol condensation catalyst may be from 0.001 to 20 parts by weight, from 0.01 to 15 parts by weight, or from 0.01 to 10 parts by weight per 100 parts by weight of the mixture of the polyoxyalkylene polymers (A) and (B) of one or more embodiments of the present invention in order to ensure both increased condensation reaction rate and desired workability in the curing process. A silanol condensation catalyst could, after curing of the curable composition, seep to the surface of the cured product or smear the surface of the cured product. An approach to this issue is to limit the amount of the silanol condensation catalyst used to the range of 0.01 to 3.0 parts by weight. Doing so allows for maintaining a good surface condition of the cured product while ensuring the curability.

(Reactive Diluent (D))

Preferably, the curable composition of one or more embodiments of the present invention further contains a reactive diluent (D) that is a polymer having 0.5 to less than 1.2 hydrolyzable silyl groups on average per molecule and having a lower viscosity as measured at 23° C. than the mixture of the polyoxyalkylene polymers (A) and (B) of one or more embodiments of the present invention. In one or more embodiments of the present invention, the addition of the reactive diluent (D) renders it possible to lower the viscosity of the composition and prevent bleed-out while ensuring high recovery performance. It should be noted that the reactive diluent (D) is a polymer that is classified neither as the polyoxyalkylene polymer (A) nor as the polyoxyalkylene polymer (B).

Examples of the main chain structure of the reactive diluent (D) include polyoxyalkylene polymers, saturated hydrocarbon polymers, (meth)acrylic ester polymers, and polyorganosiloxane polymers. Among these, a polyoxyalkylene polymer is preferred also as the main chain structure of the reactive diluent (D) in terms of the compatibility with the mixture of the polyoxyalkylene polymers (A) and (B) of one or more embodiments of the present invention.

The hydrolyzable silyl groups of the reactive diluent (D) may be present at molecular chain ends, side chains, or both. In particular, it is more preferable that the hydrolyzable silyl groups be present at the molecular chain ends, because in this case a cured rubber product having good mechanical properties is more likely to be obtained thanks to the increased molecular weight between crosslinks. The number of the hydrolyzable silyl groups is from 0.5 to less than 1.2 on average per molecule. In terms of the mechanical properties of the cured product, the number of the hydrolyzable silyl groups may be 0.6 or more. To efficiently reduce the modulus of the cured product, the number of the hydrolyzable silyl groups may be less than 1.0.

The reactive diluent (D) may have terminal olefin groups and/or internal olefin groups in addition to the hydrolyzable silyl groups or may have neither terminal olefin groups nor internal olefin groups. The total number of the hydrolyzable silyl, terminal olefin, and internal olefin groups may be 1.0 or less on average per terminal structure.

As for the molecular weight of the polymer used as the reactive diluent (D), the polystyrene-equivalent number-average molecular weight as determined by GPC may be from 3,000 to less than 15,000 in order to achieve a viscosity-reducing effect while ensuring good mechanical properties of the cured product.

The reactive diluent (D) is not limited to having a particular molecular weight distribution. The polydispersity index may be less than 2.0, 1.6 or less, or 1.4 or less. To enhance the diluting effect on the curable composition, the polydispersity index may be 1.2 or less.

The main chain structure of the reactive diluent (D) may be linear or branched and may be linear. When the reactive diluent (D) is linear, the hydrolyzable silyl group of the reactive diluent (D) may be located at only one of the two ends of the linear reactive diluent (D). The reactive diluent (D) may be a polymer in which the number of the hydrolyzable silyl groups in the molecule is one. The main chain structure need not consist of one polymer. Different polymers may be produced separately and mixed or may be produced together to obtain a desired polymer mixture.

The hydrolyzable silyl groups of the reactive diluent (D) can be selected as appropriate. It is preferable for the reactive diluent (D) to have the same hydrolyzable silyl groups as the polyoxyalkylene polymer (A) and/or polyoxyalkylene polymer (B) because in this case the physical properties of the cured product are easy to adjust. In particular, the hydrolyzable silyl groups may be methyldimethoxysilyl groups.

The content of the reactive diluent (D) may be from 1 to 200 parts by weight or from 10 to 100 parts by weight per 100 parts by weight of the mixture of the polyoxyalkylene polymers (A) and (B) of one or more embodiments of the present invention in order to achieve a viscosity-reducing effect while ensuring good mechanical properties of the cured product.

((Meth)Acrylic Ester Polymer (C))

Preferably, the curable composition of one or more embodiments of the present invention may contain a (meth)acrylic ester polymer (C) having a hydrolyzable silyl group. When the curable composition further contains the (meth)acrylic ester polymer (C), the weathering resistance of the cured product tends to be improved. The hydrolyzable silyl group of the (meth)acrylic ester polymer (C) may be present at an end, or in an inner portion, of the polymer main chain.

The (meth)acrylic ester monomer used to form the main chain of the (meth)acrylic ester polymer (C) is not limited to a particular monomer and may be any of various (meth)acrylic ester monomers. Specific examples of the (meth)acrylic ester monomer include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, (3-trimethoxysilyl)propyl (meth)acrylate, (3-dimethoxymethylsilyl)propyl (meth)acrylate, (2-trimethoxysilyl)ethyl (meth)acrylate, (2-dimethoxymethylsilyl)ethyl (meth)acrylate, trimethoxysilylmethyl (meth)acrylate, (dimethoxymethylsilyl)methyl (meth)acrylate, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, and 2-perfluorohexadecylethyl (meth)acrylate.

Examples of monomers other than those mentioned above include: acrylic monomers such as acrylic acid and methacrylic acid; monomers having an amide group, such as N-methylolacrylamide and N-methylolmethacrylamide; monomers having an epoxy group, such as glycidyl acrylate and glycidyl methacrylate; and monomers having a nitrogen-containing group, such as diethylaminoethyl acrylate and diethylaminoethyl methacrylate.

The (meth)acrylic ester polymer (C) used can be a polymer resulting from copolymerization of a (meth)acrylic ester monomer and a vinyl monomer copolymerizable with the (meth)acrylic ester monomer. Examples of the vinyl monomer include, but are not limited to: styrene monomers such as styrene, vinyltoluene, α-methylstyrene, chlorostyrene, styrenesulfonic acid, and salts of styrenesulfonic acid; fluorine-containing vinyl monomers such as perfluoroethylene, perfluoropropylene, and vinylidene fluoride; silicon-containing vinyl monomers such as vinyltrimethoxysilane and vinyltriethoxysilane; maleic monomers such as maleic anhydride, maleic acid, and monoalkyl and dialkyl esters of maleic acid; fumaric monomers such as fumaric acid and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl ester monomers such as vinyl acetate, vinyl propionate, vinyl pivalate, vinyl benzoate, and vinyl cinnamate; alkenyl monomers such as ethylene and propylene; conjugated diene monomers such as butadiene and isoprene; vinyl chloride; vinylidene chloride; allyl chloride; and allyl alcohol. Two or more of these vinyl monomers may be used as copolymerization components.

The number of the hydrolyzable silyl groups of the (meth)acrylic ester polymer (C) may be from 0.5 to 5.0 on average per molecule. The number of the hydrolyzable silyl groups may be 1.0 or more in terms of the mechanical properties of the cured product of the curable composition or 3.0 or less in terms of the stability of the (meth)acrylic ester polymer (C).

The method of introducing the hydrolyzable silyl groups into the (meth)acrylic ester polymer is not limited to a particular technique. For example, the following methods can be used.

(iv) A method in which a compound having a polymerizable unsaturated group and a hydrolyzable silyl group is copolymerized with the monomer as described above. With this method, the hydrolyzable silyl groups tend to be randomly introduced into the main chain of the polymer.

(v) A method in which a (meth)acrylic ester polymer is produced by polymerization using a hydrolyzable silyl group-containing mercaptosilane compound as a chain transfer agent. With this method, the hydrolyzable silyl groups can be introduced at the ends of the polymer.

(vi) A method in which a compound having a polymerizable unsaturated group and a reactive functional group (V group) is copolymerized and then the resulting copolymer is reacted with a compound having a hydrolyzable silyl group and a functional group reactive with the V group. Specific examples of the method (vi) include: a method in which 2-hydroxyethyl acrylate is copolymerized and then the hydroxy groups of the resulting copolymer are reacted with an isocyanatosilane having a hydrolyzable silyl group; and a method in which glycidyl acrylate is copolymerized and then the epoxy groups of the resulting copolymer are reacted with an aminosilane compound having a hydrolyzable silyl group.

(vii) A method in which terminal functional groups of a (meth)acrylic ester polymer synthesized by living radical polymerization are modified to introduce hydrolyzable silyl groups into the polymer. A (meth)acrylic ester polymer resulting from living radical polymerization allows easy introduction of functional groups at the polymer ends. The hydrolyzable silyl groups can be introduced at the polymer ends by modifying the easily introduced terminal functional groups.

The following describes examples of silicon compounds which can be used to introduce hydrolyzable silyl groups into a (meth)acrylic ester polymer by any one of the above methods. Examples of the compound used in the method (iv) and having a polymerizable unsaturated group and a hydrolyzable silyl group include 3-(trimethoxysilyl)propyl (meth)acrylate, 3-(dimethoxymethylsilyl)propyl (meth)acrylate, 3-(triethoxysilyl)propyl (meth)acrylate, (trimethoxysilyl)methyl (meth)acrylate, (dimethoxymethylsilyl)methyl (meth)acrylate, (triethoxysilyl)methyl (meth)acrylate, (diethoxymethylsilyl)methyl (meth)acrylate, and 3-((methoxymethyl)dimethoxysilyl)propyl (meth)acrylate. In terms of availability, 3-trimethoxysilylpropyl (meth)acrylate and 3-(dimethoxymethylsilyl)propyl (meth)acrylate are particularly preferred.

Examples of the hydrolyzable silyl group-containing mercaptosilane compound used in the method (v) include 3-mercaptopropyltrimethoxysilane, 3-mercaptopropyldimethoxymethylsilane, 3-mercaptopropyltriethoxysilane, mercaptomethyltrimethoxysilane, (mercaptomethyl)dimethoxymethylsilane, and mercaptomethyltriethoxysilane.

Examples of the compound used in the method (vi) and having a hydrolyzable silyl group and a functional group reactive with the V group include: isocyanatosilane compounds such as 3-isocyanatopropyltrimethoxysilane, 3-isocyanatopropyldimethoxymethylsilane, 3-isocyanatopropyltriethoxysilane, isocyanatomethyltrimethoxysilane, isocyanatomethyltriethoxysilane, isocyanatomethyldimethoxymethylsilane, and isocyanatomethyldiethoxymethylsilane; epoxysilane compounds such as 3-glycidoxypropyltrimethoxysilane, 3-glycidoxypropyltriethoxysilane, 3-glycidoxypropyldimethoxymethylsilane, glycidoxymethyltrimethoxysilane, glycidoxymethyltriethoxysilane, glycidoxymethyldimethoxymethylsilane, and glycidoxymethyldiethoxymethylsilane; and aminosilane compounds such as 3-aminopropyltrimethoxysilane, 3-aminopropyltriethoxysilane, 3-aminopropyldimethoxymethylsilane, aminomethyltrimethoxysilane, aminomethyltriethoxysilane, aminomethyldimethoxymethylsilane, N-cyclohexylaminomethyltriethoxysilane, N-cyclohexylaminomethyldiethoxymethylsilane, N-phenylaminomethyltrimethoxysilane, N-(2-aminoethyl)aminomethyltrimethoxysilane, and N-(2-aminoethyl)-3-aminopropyltrimethoxysilane.

In the method (vii), any modification reaction can be used. Examples of the modification reaction method include: a method using a compound having a hydrolyzable silyl group and a functional group reactive with the terminal reactive group resulting from polymerization; and a method in which double bonds are introduced at the polymer ends using a compound having a double bond and a functional group reactive with the terminal reactive group and subsequently hydrolyzable silyl groups are introduced at the polymer ends through a process such as hydrosilylation.

The methods described above may be used in any combination. For example, a combined use of the methods (vi) and (v) can result in a (meth)acrylic ester polymer having hydrolyzable silyl groups both at the molecular chain ends and in the side chains.

The hydrolyzable silyl group of the (meth)acrylic ester polymer (C) can be represented by the following formula (8) like the hydrolyzable silyl group of the polyoxyalkylene polymer (A) and/or (B).

$$-(Si(R^1_{2-b})(Y'_b)O)_m SiR^2_{3-a}Y_a \qquad (8)$$

$R^1$, $R^2$, Y, Y', a, b, and m are as defined for the formula (1). When m is 0, the formula (8) can be expressed as the following formula (9).

$$-SiR^2_{3-a}Y_a \qquad (9)$$

In the formula (9), a represents 1, 2, or 3. Specific examples of hydrolyzable silyl groups preferred as that of the (meth)acrylic ester polymer (C) include methyldimethoxysilyl, methyldiethoxysilyl, trimethoxysilyl, and triethoxysilyl groups. A methyldimethoxysilyl group is more preferred in order to ensure both the storage stability and curability of the curable composition containing the (meth) acrylic ester polymer (C). In order to enhance the recovery performance of a cured product of the composition, a trimethoxysilyl group is more preferred.

It is common practice for those skilled in the art to choose the monomer composition of the (meth)acrylic ester polymer (C) depending on the application or purpose. For an application requiring flexibility such as the use in a sealing material, the polymer (C) may be a polymer having a relatively low glass transition temperature (Tg). The glass transition temperature Tg may be from −100 to 100° C. or from −60 to 0° C. The Tg can be determined by the Fox equation given below.

$$1/(Tg(K)) = \Sigma(Mi/Tgi) \quad \text{Fox equation:}$$

In this equation, Mi represents the weight fraction of a monomer component i of the polymer and Tgi represents the glass transition temperature (K) of a homopolymer of the monomer i.

The number-average molecular weight of the (meth) acrylic ester polymer (C) is not limited to a particular range. The polystyrene-equivalent number-average molecular weight as determined by GPC analysis may be from 500 to 100,000, from 1,500 to 50,000, or from 5,000 to 30,000.

Methods of blending a polyoxyalkylene polymer and a (meth)acrylic ester polymer are proposed, for example, in Japanese Laid-Open Patent Application Publication No. S59-122541, Japanese Laid-Open Patent Application Publication No. S63-112642, Japanese Laid-Open Patent Application Publication No. H6-172631, and Japanese Laid-Open Patent Application Publication No. H11-116763. An alternative method is to polymerize a (meth)acrylic ester monomer in the presence of a polyoxypropylene polymer having a hydrolyzable silyl group. The details of this production method are disclosed in various publications such as Japanese Laid-Open Patent Application Publication No. S59-78223, Japanese Laid-Open Patent Application Publication No. S60-228516, and Japanese Laid-Open Patent Application Publication No. S60-228517. The blending of the mixture of the polyoxyalkylene polymers (A) and (B) of one or more embodiments of the present invention and the (meth)acrylic ester polymer (C) can be accomplished by, but is not limited to, any of the methods as described in the above publications.

The ratio between the mixture of the polyoxyalkylene polymers (A) and (B) of one or more embodiments of the present invention and the (meth)acrylic ester polymer (C) is not limited to a particular range. The mixture:polymer (C) weight ratio may be from 95:5 to 10:90, from 90:10 to 20:80, or from 80:20 to 40:60. For each of the mixture of the polyoxyalkylene polymers (A) and (B) of one or more embodiments of the present invention and the (meth)acrylic ester polymer (C), one mixture or polymer may be used alone, or two or more mixtures or polymers may be used in combination.

(Additional Components)

Additional components may be added to the curable composition of one or more embodiments of the present invention, and examples of the additional components include a silicon compound, an adhesion promoter, a plasticizer, a solvent, a diluent, a silicate, a filler, an anti-sagging agent, an antioxidant, a light stabilizer, an ultraviolet absorber, a property modifier, a tackifying resin, an epoxy group-containing compound, a photocurable material, an oxygen-curable material, a surface modifier, an epoxy resin, another resin, a flame retardant, and a foaming agent. Furthermore, various additives may be added, if desired, to the curable composition of one or more embodiments of the present invention in order to adjust the physical properties of the curable composition or a cured product of the composition. Examples of the additives include a curability modifier, a radical inhibitor, a metal deactivator, an antiozonant, a phosphorus-based peroxide decomposer, a lubricant, a pigment, and a fungicide.

<Filler>

Various fillers can be added to the composition of one or more embodiments of the present invention. Examples of the fillers include heavy calcium carbonate, colloidal calcium carbonate, magnesium carbonate, diatomite, clay, talc, titanium oxide, fumed silica, precipitated silica, crystalline silica, molten silica, silicic anhydride, hydrated silicic acid, carbon black, ferric oxide, aluminum fines, zinc oxide, activated zinc oxide, PVC powder, PMMA powder, and glass fibers or filaments. One filler may be used alone, or two or more fillers may be mixed and used.

The amount of the filler used may be from 1 to 300 parts by weight or from 10 to 250 parts by weight per 100 parts by weight of the mixture of the polyoxyalkylene polymers (A) and (B) of one or more embodiments of the present invention.

An organic or inorganic balloon may be added to reduce the weight (or reduce the specific gravity) of the composition. The balloon is a spherical filler whose interior is hollow, and examples of the material of the balloon include: inorganic materials such as glass, Shirasu soil, and silica; and organic materials such as phenol resin, urea resin, polystyrene, and Saran. One balloon may be used alone, or two or more balloons may be mixed and used.

The amount of the balloon used may be from 0.1 to 100 parts by weight or from 1 to 20 parts by weight per 100 parts by weight of the mixture of the polyoxyalkylene polymers (A) and (B) of one or more embodiments of the present invention.

<Adhesion Promoter>

An adhesion promoter can be added to the composition of one or more embodiments of the present invention. A silane coupling agent or a reaction product of the silane coupling agent can be added as the adhesion promoter.

Specific examples of the silane coupling agent include: amino group-containing silanes such as γ-aminopropyltrimethoxysilane, γ-aminopropylmethyldimethoxysilane, N-β-aminoethyl-γ-aminopropyltrimethoxysilane, N-β-aminoethyl-γ-aminopropylmethyldimethoxysilane, N-phenyl-γ-aminopropyltrimethoxysilane, and (2-aminoethyl)aminomethyltrimethoxysilane; isocyanate group-containing silanes such as γ-isocyanatopropyltrimethoxysilane, γ-isocyanatopropyltriethoxysilane, γ-isocyanatopropylmethyldimethoxysilane, α-isocyanatomethyltrimethoxysilane, and α-isocyanatomethyldimethoxymethylsilane; mercapto group-containing silanes such as γ-mercaptopropyltrimethoxysilane, γ-mercaptopropyltriethoxysilane, and γ-mercaptopropylmethyldimethoxysilane; and epoxy group-containing silanes such as γ-glycidoxypropyltrimethoxysilane and β-(3,4-epoxycyclohexyl)ethyltrimethoxysilane. Reaction products of the various silane coupling agents can also be used. One adhesion promoter may be used alone, or two or more adhesion promoters may be mixed and used.

The amount of the adhesion promoter used may be from 0.1 to 20 parts by weight or from 0.5 to 10 parts by weight per 100 parts by weight of the mixture of the polyoxyalkylene polymers (A) and (B) of one or more embodiments of the present invention.

<Plasticizer>

A plasticizer can be added to the composition of one or more embodiments of the present invention. Specific examples of the plasticizer include: phthalic ester compounds such as dibutyl phthalate, diisononyl phthalate (DINP), diheptyl phthalate, di(2-ethylhexyl) phthalate, diisodecyl phthalate (DIDP), and butyl benzyl phthalate; terephthalic ester compounds such as bis(2-ethylhexyl)-1,4-benzenedicarboxylate; non-phthalic ester compounds such as diisononyl 1,2-cyclohexanedicarboxylate; aliphatic polyfunctional carboxylic ester compounds such as dioctyl adipate, dioctyl sebacate, dibutyl sebacate, diisodecyl succinate, and tributyl acetylcitrate; unsaturated fatty acid ester compounds such as butyl oleate and methyl acetyl ricinoleate; alkylsulfonic acid phenyl esters; phosphoric ester compounds; trimellitic ester compounds; chlorinated paraffin; hydrocarbon oils such as alkyl diphenyl and partially-hydrogenated terphenyl; process oil; and epoxy plasticizers such as epoxidized soybean oil and benzyl epoxystearate.

A polymeric plasticizer can also be used. Specific examples of the polymeric plasticizer include: vinyl polymers; polyester plasticizers; polyethers such as polyether polyols (e.g., polyethylene glycol and polypropylene glycol having a number-average molecular weight of 500 or more) and derivatives resulting from conversion of the hydroxy groups of the polyether polyols to ester or ether groups; polystyrenes; polybutadiene; polybutene; polyisobutylene; butadiene-acrylonitrile; and polychloroprene.

The amount of the plasticizer used may be from 5 to 150 parts by weight, from 10 to 120 parts by weight, or from 20 to 100 parts by weight per 100 parts by weight of the mixture of the polyoxyalkylene polymers (A) and (B) of one or more embodiments of the present invention. One plasticizer may be used alone, or two or more plasticizers may be used in combination.

<Solvent and Diluent>

A solvent or diluent can be added to the composition of one or more embodiments of the present invention. The solvent or diluent used is not limited to a particular compound, and may be an aliphatic hydrocarbon, an aromatic hydrocarbon, an alicyclic hydrocarbon, a halogenated hydrocarbon, an alcohol, an ester, a ketone, or an ether. When a solvent or diluent is used, the boiling point of the solvent or diluent may be 150° C. or higher, 200° C. or higher, or 250° C. or higher to avoid indoor air pollution during indoor use of the composition. One solvent or diluent may be used alone, or two or more solvents or diluents may be used in combination.

<Anti-Sagging Agent>

An anti-sagging agent may be added, if desired, to the composition of one or more embodiments of the present invention to prevent sagging and improve workability. Examples of the anti-sagging agent include, but are not limited to, polyamide waxes, hydrogenated castor oil derivatives, and metallic soaps such as calcium stearate, aluminum stearate, and barium stearate. One anti-sagging agent may be used alone, or two or more anti-sagging agents may be used in combination.

The amount of the anti-sagging agent used may be from 0.1 to 20 parts by weight per 100 parts by weight of the mixture of the polyoxyalkylene polymers (A) and (B) of one or more embodiments of the present invention.

<Antioxidant>

An antioxidant (anti-aging agent) can be used in the composition of one or more embodiments of the present invention. The use of an antioxidant can increase the weathering resistance of the cured product. Examples of the antioxidant include hindered phenol antioxidants, monophenol antioxidants, bisphenol antioxidants, and polyphenol antioxidants. Specific examples of the antioxidant are described in Japanese Laid-Open Patent Application Publication No. H4-283259 and Japanese Laid-Open Patent Application Publication No. H9-194731.

The amount of the antioxidant used may be from 0.1 to 10 parts by weight or from 0.2 to 5 parts by weight per 100 parts by weight of the mixture of the polyoxyalkylene polymers (A) and (B) of one or more embodiments of the present invention.

<Light Stabilizer>

A light stabilizer can be used in the composition of one or more embodiments of the present invention. The use of a light stabilizer can prevent photooxidative degradation of the cured product. Examples of the light stabilizer include benzotriazole, hindered amine, and benzoate compounds. Particularly preferred are hindered amine compounds.

The amount of the light stabilizer used may be from 0.1 to 10 parts by weight or from 0.2 to 5 parts by weight per 100 parts by weight of the mixture of the polyoxyalkylene polymers (A) and (B) of one or more embodiments of the present invention.

<Ultraviolet Absorber>

An ultraviolet absorber can be used in the composition of one or more embodiments of the present invention. The use of an ultraviolet absorber can increase the surface weathering resistance of the cured product. Examples of the ultraviolet absorber include benzophenone, benzotriazole, salicylate, substituted tolyl, and metal chelate compounds. Particularly preferred are benzotriazole compounds, examples of which include those sold under the trade names Tinuvin P, Tinuvin 213, Tinuvin 234, Tinuvin 326, Tinuvin 327, Tinuvin 328, Tinuvin 329, and Tinuvin 571 (all of these are manufactured by BASF).

The amount of the ultraviolet absorber used may be from 0.1 to 10 parts by weight or from 0.2 to 5 parts by weight per 100 parts by weight of the mixture of the polyoxyalkylene polymers (A) and (B) of one or more embodiments of the present invention.

<Property Modifier>

A property modifier may be added, if desired, to the curable composition of one or more embodiments of the present invention for the purpose of modifying the tensile properties of the resulting cured product. Examples of the property modifier include, but are not limited to: alkylalkoxysilanes such as phenoxytrimethylsilane, methyltrimethoxysilane, dimethyldimethoxysilane, trimethylmethoxysilane, and n-propyltrimethoxysilane; arylalkoxysilanes such as diphenyldimethoxysilane and phenyltrimethoxysilane; alkylisopropenoxysilanes such as dimethyldiisopropenoxysilane, methyltriisopropenoxysilane, and γ-glycidoxypropylmethyldiisopropenoxysilane; trialkylsilyl borates such as tris(trimethylsilyl) borate and tris(triethylsilyl) borate; silicone varnishes; and polysiloxanes. The use of the property modifier can increase the hardness of the cured product of the composition of one or more embodiments of the present invention or conversely decrease the hardness and increase the elongation at break. One property modifier may be used alone, or two or more property modifiers may be used in combination.

In particular, a compound hydrolyzable to form a compound having a monovalent silanol group in the molecule has the advantage of decreasing the modulus of the cured product without aggravating the stickiness of the surface of the cured product. Particularly preferred is a compound the hydrolysis of which gives trimethylsilanol. Examples of the compound hydrolyzable to form a compound having a monovalent silanol group in the molecule include silicon compounds which are derivatives of alcohols such as hexanol, octanol, phenol, trimethylolpropane, glycerin, pentaerythritol, and sorbitol and the hydrolysis of which gives monosilanols.

The amount of the property modifier used may be from 0.1 to 10 parts by weight or from 0.5 to 5 parts by weight per 100 parts by weight of the mixture of the polyoxyalkylene polymers (A) and (B) of one or more embodiments of the present invention.

<Tackifying Resin>

A tackifying resin can be added, if desired, to the composition of one or more embodiments of the present invention for the purpose of increasing the bond strength or adhesion to a substrate or any other purpose. The tackifying resin used is not limited to a particular resin, and may be a commonly used tackifying resin.

Specific examples of the tackifying resin include terpene resins, aromatic modified terpene resins, hydrogenated terpene resins, terpene-phenol resins, phenol resins, modified phenol resins, xylene-phenol resins, cyclopentadiene-phenol resins, coumarone-indene resins, rosin resins, rosin ester resins, hydrogenated rosin ester resins, xylene resins, low-molecular-weight polystyrene resins, styrene copolymer resins, styrene block copolymers, hydrogenated styrene block copolymers, petroleum resins (such as C5 hydrocarbon resins, C9 hydrocarbon resins, and C5-C9 hydrocarbon copolymer resins), hydrogenated petroleum resins, and DCPD resins. One of these may be used alone, or two or more thereof may be used in combination.

The amount of the tackifying resin used may be from 2 to 100 parts by weight, from 5 to 50 parts by weight, or from 5 to 30 parts by weight per 100 parts by weight of the mixture of the polyoxyalkylene polymers (A) and (B) of one or more embodiments of the present invention.

<Epoxy Group-Containing Compound>

An epoxy group-containing compound can be used in the composition of one or more embodiments of the present invention. The use of an epoxy group-containing compound can improve the recovery performance of the cured product. Examples of the epoxy group-containing compound include epoxidized unsaturated fats and oils, epoxidized unsaturated fatty acid esters, alicyclic epoxy compounds, epichlorohydrin derivatives, and mixtures of the derivatives. Specific examples include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. It is recommended that the epoxy compound be used in an amount of 0.5 to 50 parts by weight per 100 parts by weight of the mixture of the polyoxyalkylene polymers (A) and (B) of one or more embodiments of the present invention.

<Photocurable Material>

A photocurable material can be used in the composition of one or more embodiments of the present invention. The use of a photocurable material can lead to the formation of a coating of the photocurable material on the surface of the cured product, resulting in reduction in stickiness of the cured product or increase in weathering resistance of the cured product. A wide variety of such compounds are known, including organic monomers, oligomers, resins, and compositions containing them. Typical examples of photocurable materials which can be used include: an unsaturated acrylic compound which is a monomer or an oligomer having one or more unsaturated acrylic or methacrylic groups or a mixture of the monomer and oligomer; polyvinyl cinnamates; and azide resins.

The photocurable material may be used in an amount of 0.1 to 20 parts by weight, or 0.5 to 10 parts by weight, per 100 parts by weight of the mixture of the polyoxyalkylene polymers (A) and (B) of one or more embodiments of the present invention.

<Oxygen-Curable Material>

An oxygen-curable material can be used in the composition of one or more embodiments of the present invention. Examples of the oxygen-curable material include unsaturated compounds reactive with oxygen in the air. The oxygen-curable material reacts with oxygen in the air to form a cured coating in the vicinity of the surface of the cured product, thus offering benefits such as preventing the surface of the cured product from being sticky and preventing deposition of dirt and dust on the surface of the cured product. Specific examples of the oxygen-curable material include: drying oils exemplified by tung oil and linseed oil; various alkyd resins resulting from modification of the drying oil compounds; drying oil-modified acrylic polymers, epoxy resins, and silicone resins; and liquid polymers such as 1,2-polybutadiene, 1,4-polybutadiene, and C5 to C8 diene polymers which are obtained by polymerization or copolymerization of diene compounds such as butadiene, chloroprene, isoprene, and 1,3-pentadiene. One of these materials may be used alone, or two or more thereof may be used in combination.

The oxygen-curable material may be used in an amount of 0.1 to 20 parts by weight, or 0.5 to 10 parts by weight, per 100 parts by weight of the mixture of the polyoxyalkylene polymers (A) and (B) of one or more embodiments of the present invention. It is recommended that the oxygen-curable material be used in combination with a photocurable material as taught in Japanese Laid-Open Patent Application Publication No. H3-160053.

<Epoxy Resin>

An epoxy resin can also be used in the composition of one or more embodiments of the present invention. The composition containing an added epoxy resin is suitable especially for use as an adhesive, in particular an adhesive for exterior wall tiles. Examples of the epoxy resin include bisphenol A epoxy resins and novolac epoxy resins.

As for the ratio between the epoxy resin used and the mixture of the polyoxyalkylene polymers (A) and (B) of one or more embodiments of the present invention, the mixture of polyoxyalkylene polymers (A) and (B)/epoxy resin weight ratio may be in the range of 100/1 to 1/100.

When the epoxy resin is added to the composition of one or more embodiments of the present invention, a curing agent for curing the epoxy resin can also be used in the composition. The epoxy resin-curing agent used is not limited to a particular material, and may be a commonly used epoxy resin-curing agent.

When a curing agent for curing the epoxy resin is used, the amount of the curing agent may be from 0.1 to 300 parts by weight per 100 parts by weight of the epoxy resin.

<<Preparation of Curable Composition>>

The curable composition of one or more embodiments of the present invention can be prepared as a one-part composition all the components of which are blended together and hermetically stored and which, when applied to any object, cures under the action of moisture in the air. The curable composition of one or more embodiments of the present invention can be prepared also as a two-part composition consisting of an organic polymer composition and a curing agent blend which is prepared separately from the organic polymer composition by blending components such as a silanol condensation catalyst, a filler, a plasticizer, and water. In the case of this two-part composition, the organic polymer composition and the blend are mixed before use. In terms of workability, the curable composition of one or more embodiments of the present invention may be prepared as a one-part composition.

In the case where the curable composition is a one-part composition, all the components are blended together beforehand. Thus, it is preferable that a water-containing component be dried to remove water before use or dehydrated by a manipulation such as pressure reduction during blending or kneading. The storage stability of the composition can be further improved by not only performing the drying/dehydration process but also adding an alkoxysilane compound such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane.

In the case of using a dehydrating agent, in particular a water-reactive silicon compound such as vinyltrimethoxysilane, the amount of the compound used as the dehydrating agent may be from 0.1 to 20 parts by weight or from 0.5 to 10 parts by weight per 100 parts by weight of the mixture of the polyoxyalkylene polymers (A) and (B) of one or more embodiments of the present invention.

<Applications>

The curable composition of one or more embodiments of the present invention can be used as a pressure-sensitive adhesive, a sealing material for use in buildings, ships, automobiles, and roads, an adhesive, a waterproofing material, a coating-waterproofing material, a mold making material, a vibration-isolating material, a vibration-damping material, a soundproofing material, a foam material, a paint, or a spray material. Since a cured product obtained by curing the curable composition of one or more embodiments of the present invention has excellent flexibility and bond strength, the curable composition is suitable for use as a sealing material or an adhesive.

The curable composition of one or more embodiments of the present invention can be used in diverse applications, including: a material for use in an electrical or electronic part, such as a sealant for the back side of a solar cell; an electrical insulating material of an electrical or electronic part or device, such as an insulating sheath material for an electric wire or cable; an acoustic insulating material; an elastic adhesive; a binder; a contact adhesive; a spray-type sealing material; a crack-repairing material; an adhesive for tile laying; an adhesive for an asphalt-waterproofing material; a powder paint; a cast molding material; a rubber material for medical purposes; a pressure-sensitive adhesive for medical purposes; a pressure-sensitive adhesive sheet for medical purposes; a medical device sealing material; a dental impression material; a food packaging material; a joint sealing material for exterior cladding such as siding board; a coating material; an anti-skid covering material; a buffer material; a primer; an electrically conductive material for electromagnetic wave shielding; a thermally conductive material; a hot-melt material; a potting agent for electrical or electronic purposes; a film; a gasket; a concrete-reinforcing material; an adhesive for temporary bonding; any kind of molding material; a rust-proofing or waterproofing sealant for an edge face (cut edge) of wire glass or laminated glass; and a liquid sealing material for use in industrial parts such as parts of automobiles, large vehicles (e.g., cargo trucks and buses), railroad cars, aircrafts, ships, electric machines, and various other mechanical machines. For example, in an automobile, the curable composition of one or more embodiments of the present invention can be used for diverse purposes, such as for adhesive mounting of various parts such as a plastic cover, a trim, a flange, a bumper, a window, and interior and exterior parts. Furthermore, the curable composition can, alone or with the help of a primer, adhere to a wide variety of substrates such as glass, porcelain, wood, metal, and a resin molded article, and thus can be used as any of various types of sealing compositions and adhesive compositions. Additionally, the curable composition of one or more embodiments of the present invention can be used as an adhesive for interior panels, an adhesive for exterior panels, an adhesive for tile laying, an adhesive for stone laying, an adhesive for ceiling finishing, an adhesive for floor finishing, an adhesive for wall finishing, an adhesive for vehicle panels, an adhesive for assembly of electrical, electronic, or precision equipment, an adhesive for bonding of leather, fiber products, fabric, paper, plates, or rubber, a reactive, post-curing pressure-sensitive adhesive, a sealing material for direct glazing, a sealing material for double-glazed glass, a sealing material for SSG, a sealing material for working joints of buildings, or a material for civil engineering or bridge construction. The curable composition can be used also as a pressure-sensitive adhesive material such as a pressure-sensitive adhesive tape or sheet.

EXAMPLES

Hereinafter, one or more embodiments of the present invention will be described in more detail using examples. One or more embodiments of the present invention are not limited to the examples given below.

The term "both ends-terminated component" as used below refers to linear polyoxypropylene having reactive silyl groups and/or groups into which reactive silyl groups can be introduced (e.g., hydroxy or allyl groups) at both ends of the linear chain. In the "both ends-terminated component", the number of the terminal structures in the polymer molecule is two.

The term "one end-terminated component" as used below refers to linear polyoxypropylene having a reactive silyl group and/or a group into which a reactive silyl group can be introduced at only one of the two ends of the linear chain and having neither a reactive silyl group nor a group into which a reactive silyl group can be introduced at the other end of the linear chain. In the "one end-terminated component", the number of the terminal structures in the polymer molecule is one.

The both ends-terminated component can be classified as the polyoxyalkylene polymer (A) according to the first and second aspects, and the one end-terminated component can be classified as the polyoxyalkylene polymer (B) according to the first and second aspects.

Synthesis Example 1

Propylene oxide was polymerized using a mixture of polyoxypropylene diol having a number-average molecular weight of about 4,500 and n-butanol as an initiator in the presence of a zinc hexacyanocobaltate-glyme complex catalyst. The polymerization was carried out until the molecular weight indicated below was reached. As a result, a hydroxy-terminated polyoxypropylene mixture (E-1) was obtained in which the number-average molecular weight inclusive of the both ends-terminated component and the one end-terminated component was about 17,000. In the polyoxypropylene mixture (E-1), the both ends-terminated component/one end-terminated component weight ratio was about 7/3.

Synthesis Examples 2 to 10

As shown in Table 1, hydroxy-terminated polyoxypropylene or hydroxy-terminated polyoxypropylene mixtures (E-2) to (E-10) were obtained by using polyoxypropylene diol having a number-average molecular weight of about 4,500 and/or n-butanol as an initiator and performing the procedures as described in Synthesis Example 1.

TABLE 1

|  |  | Synth. Example 1 | Synth Example 2 | Synth Example 3 | Synth. Example 4 | Synth. Example 5 | Synth. Example 6 | Synth. Example 7 | Synth. Example 8 | Synth Example 9 | Synth. Example 10 |
|---|---|---|---|---|---|---|---|---|---|---|---|
|  | Name of polymer (E) | (E-1) | (E-2) | (E-3) | (E-4) | (E-5) | (E-6) | (E-7) | (E-8) | (E-9) | (E-10) |
| Raw materials | Polyoxypropylene diol (number-average molecular weight: 4,500) | Used | Used | Used | Used | Used | Used | Used | Used | Not used | Used |
|  | n-Butanol | Used | Not used | Used | Not used | Used | Not used | Used | Not used | Used | Not used |
| Physical properties of polymer (E) | Number-average molecular weight | 17,000 | 19,000 | 15,000 | 16,000 | 18,000 | 21,000 | 12,000 | 15,000 | 8,000 | 28,000 |
|  | Both ends-terminated component/One end-terminated component (weight ratio) | 7/3 | Both ends-terminated component alone | 7/3 | Both ends-terminated component alone | 7/3 | Both ends-terminated component alone | 7/3 | Both ends-terminated component alone | One end-terminated component alone | Both ends-terminated component alone |

Example 1

Sodium methoxide dissolved in methanol was added to the hydroxy-terminated polyoxypropylene mixture (E-1) in an amount of 1.0 equivalents per equivalent of the hydroxy groups of the hydroxy-terminated polyoxypropylene mixture (E-1), and methanol was then distilled off at 140° C. Subsequently, 2.0 equivalents of allyl glycidyl ether was added at 140° C., and the reaction was allowed to proceed for 2 hours to introduce unsaturated bonds. Further, 1.5 equivalents of 3-chloro-1-propene (allyl chloride) was added to convert the terminal hydroxy groups to allyl groups. The remaining impurities such as a metal salt were removed from the resulting allyl-terminated polyoxypropylene mixture, and then 50 ppm of a platinum-divinyldisiloxane complex (isopropyl alcohol solution with a concentration of 3% by mass calculated as the platinum content) and 2.1 parts by weight of methyldimethoxysilane were added to 100 parts by weight of the allyl-terminated polyoxypropylene mixture. The reaction was allowed to proceed at 90° C. for 2 hours to yield a polyoxypropylene mixture (AB-1) which had terminal methyldimethoxysilyl groups and in which the number-average molecular weight inclusive of the both ends-terminated component and the one end-terminated component was 17,000.

In the polyoxypropylene mixture (AB-1), the total number of the hydrolyzable silyl, terminal olefin, and internal olefin groups per terminal structure (the total number will be referred to as "total number of groups per terminal structure" hereinafter) was 3.0, the percentage of the number of moles of the hydrolyzable silyl groups to the total number of moles of the hydrolyzable silyl, terminal olefin, and internal olefin groups (the percentage will be referred to as "degree of hydrolyzable silyl group introduction" hereinafter) was 55%, the number of the hydrolyzable silyl groups per terminal structure was 1.7, and the viscosity at 23° C. was 11 Pa·s. In the polyoxypropylene mixture (AB-1), the both ends-terminated component/one end-terminated component weight ratio was about 7/3. The polyoxypropylene mixture (AB-1) was used in Example 21.

The polyoxypropylene mixture (AB-1) contains both a polyoxyalkylene polymer (A) which is a both ends-terminated component having two terminal structures in the molecule and a polyoxyalkylene polymer (B) which is a one end-terminated component having one terminal structure in the molecule. Although the polymers may be respectively denoted by (A-1) and (B-1), the mixture of the two polymers is denoted by (AB-1) for convenience in view of the fact that the polymers were produced together.

The polyoxyalkylene polymers (A) and (B) contained in the polyoxypropylene mixture (AB-1) were terminally modified together. Thus, the total number of groups per terminal structure and the degree of hydrolyzable silyl group introduction in each polymer can be considered equal to the total number of groups per terminal structure and the degree of hydrolyzable silyl group introduction in the whole mixture.

The same applies to other mixtures described below (AB-2 to AB-9 and AB-11 to AB-14).

Examples 2 to 4 and 6 to 10, Comparative Examples 1 to 4, and Synthesis Examples 11 to 20

Methyldimethoxysilyl-terminated polyoxypropylene or methyldimethoxysilyl-terminated polyoxypropylene mixtures (AB-1 to AB-9, AB-11 to AB-14, A-31 to A-37, B-21 to B-22, and D-1) were obtained by using hydroxy-terminated polymers (E) listed in Tables 2-1 and 2-2 and performing the procedures as described in Example 1 with the material proportions indicated in Table 2.

TABLE 2-1

|  |  | Example 1 | Example 2 | Example 3 | Example 4 | Example 6 | Example 7 | Example 8 | Example 9 | Example 10 | Comp. Example 1 | Comp. Example 2 |
|---|---|---|---|---|---|---|---|---|---|---|---|---|
|  | Name of polymer mixture or polymer | (AB-1) | (AB-2) | (AB-3) | (AB-4) | (AB-5) | (AB-6) | (AB-7) | (AB-8) | (AB-9) | (AB-11) | (AB-12) |
| Raw materials | Hydroxy-terminated polymer (E) | (E-1) | (E-3) | (E-5) | (E-7) | (E-1) | (E-1) | (E-1) | (E-1) | (E-1) | (E-1) | (E-1) |
|  | Sodium methoxide (Methanol solution) (Unit: equivalents) | 1.0 | 1.0 | 1.0 | 1.0 | 1.0 | 1.0 | 1.0 | 1.0 | 1.0 | 1.0 | 1.0 |
|  | Allyl glycidyl ether (Unit: equivalents) | 2.0 | 1.7 | 1.2 | 1.0 | 3.0 | 3.0 | 1.2 | 1.2 | 1.2 | 3.0 | 3.0 |
|  | Allyl chloride (Unit: equivalents) | 1.5 | 1.5 | 1.5 | 1.5 | 1.5 | 1.5 | 1.5 | 1.5 | 1.5 | 1.5 | 1.5 |

TABLE 2-1-continued

|  |  | Example 1 | Example 2 | Example 3 | Example 4 | Example 6 | Example 7 | Example 8 | Example 9 | Example 10 | Comp. Example 1 | Comp. Example 2 |
|---|---|---|---|---|---|---|---|---|---|---|---|---|
|  | Methyldimethoxysilane (Unit: parts by weight) | 2.1 | 2.3 | 1.8 | 2.5 | 2.3 | 2.8 | 1.8 | 2.0 | 2.2 | 1.6 | 4.2 |
| Physical properties of polymer (A) alone | Number of terminal structures in polymer molecule | 2 | 2 | 2 | 2 | 2 | 2 | 2 | 2 | 2 | 2 | 2 |
|  | Total number of groups per terminal structure | 3.0 | 2.7 | 2.2 | 2.0 | 4.0 | 4.0 | 2.2 | 2.2 | 2.2 | 4.0 | 4.0 |
| Physical properties of polymer (B) alone | Number of terminal structures in polymer molecule | 1 | 1 | 1 | 1 | 1 | 1 | 1 | 1 | 1 | 1 | 1 |
|  | Total number of groups per terminal structure | 3.0 | 2.7 | 2.2 | 2.0 | 4.0 | 4.0 | 2.2 | 2.2 | 2.2 | 4.0 | 4.0 |
| Physical properties of polymer mixture or polymer alone | Number-average molecular weight | 17,000 | 15,000 | 18,000 | 12,000 | 17,000 | 17,000 | 17,000 | 17,000 | 17,000 | 17,000 | 17,000 |
|  | Viscosity at 23° C. (Pa·s) | 11 | 8 | 12 | 4 | 12 | 12 | 11 | 11 | 11 | 11 | 12 |
|  | Total number of groups per terminal structure | 3.0 | 2.7 | 2.2 | 2.0 | 4.0 | 4.0 | 2.2 | 2.2 | 2.2 | 4.0 | 4.0 |
|  | Degree of hydrolyzable silyl group introduction | 55% | 58% | 66% | 61% | 45% | 54% | 58% | 66% | 72% | 31% | 77% |
|  | Number of hydrolyzable silyl groups per terminal structure | 1.7 | 1.6 | 1.5 | 1.2 | 1.8 | 2.2 | 1.3 | 1.5 | 1.6 | 1.2 | 3.1 |
|  | Both ends-terminated component/One end-terminated component (weight ratio) | 7/3 | 7/3 | 7/3 | 7/3 | 7/3 | 7/3 | 7/3 | 7/3 | 7/3 | 7/3 | 7/3 |
| Example in which polymer mixture or polymer was used alone for evaluation of physical properties |  | Example 21 | Example 22 | Example 23 | Example 24 | Example 26 | Example 27 | Example 28 | Example 29 | Example 30 | Comp. Example 26 | Comp. Example 27 |

TABLE 2-2

|  |  | Comp. Example 3 | Comp. Example 4 | Synth Example 11 | Synth. Example 12 | Synth Example 13 | Synth Example 14 |
|---|---|---|---|---|---|---|---|
| Name of polymer mixture or polymer |  | (AB-13) | (AB-14) | (A-31) | (A-32) | (A-33) | (A-34) |
| Raw materials | Hydroxy-terminated polymer (E) | (E-1) | (E-1) | (E-2) | (E-4) | (E-6) | (E-8) |
|  | Sodium methoxide (Methanol solution) (Unit: equivalents) | 1.0 | 1.2 | 1.0 | 1.0 | 1.0 | 1.0 |
|  | Allyl glycidyl ether (Unit: equivalents) | 1.2 | Not used | 2.0 | 1.5 | 1.4 | 1.0 |
|  | Allyl chloride (Unit: equivalents) | 1.5 | 1.5 | 1.5 | 1.5 | 1.5 | 1.5 |
|  | Methyldimethoxy silane (Unit: parts by weight) | 1.1 | 1.2 | 1.7 | 2.0 | 1.6 | 2.0 |
| Physical properties of polymer (A) alone | Number of terminal structures in polymer molecule | 2 | 2 | 2 | 2 | 2 | 2 |
|  | Total number of groups per terminal structure | 2.2 | 1.0 | 3.0 | 2.5 | 2.4 | 2.0 |
| Physical properties of polymer (B) or (D) alone | Number of terminal structures in polymer molecule | 1 | 1 | — | — | — | — |
|  | Total number of groups per terminal structure | 2.2 | 1.0 | — | — | — | — |
| Physical properties of polymer mixture or polymer alone | Number-average molecular weight | 17,000 | 17,000 | 19,000 | 16,000 | 21,000 | 15,000 |
|  | Viscosity at 23° C. (Pa·s) | 10 | 10 | 13 | 8 | 18 | 7 |
|  | Total number of groups per terminal structure | 2.2 | 1.0 | 3.0 | 2.5 | 2.4 | 2.0 |
|  | Degree of hydrolyzable silyl group introduction | 35% | 76% | 42% | 46% | 50% | 46% |
|  | Number of hydrolyzable silyl groups per terminal structure | 0.8 | 0.8 | 1.3 | 1.2 | 1.2 | 0.9 |
|  | Both ends-terminated component/One end-terminated component (weight ratio) | 7/3 | 7/3 | Both ends-terminated component alone | Both ends-terminated component alone | Both ends-terminated component alone | Both ends-terminated component alone |

TABLE 2-2-continued

| Example in which polymer mixture or polymer was used alone for evaluation of physical properties | | Comp. Example 28 | Comp Example 29 | Comp. Example 21 | Comp. Example 22 | Comp. Example 23 | Comp. Example 24 |
|---|---|---|---|---|---|---|---|
| | | Synth. Example 15 | Synth. Example 16 | Synth. Example 17 | Synth. Example 18 | Synth. Example 19 | Synth Example 20 |
| Raw materials | Name of polymer mixture or polymer | (A-35) | (A-36) | (A-37) | (D-1) | (B-21) | (B-22) |
| | Hydroxy-terminated polymer (E) | (E-2) | (E-2) | (E-10) | (E-9) | (E-9) | (E-9) |
| | Sodium methoxide (Methanol solution) (Unit: equivalents) | 1.0 | 1.0 | 1.0 | 1.2 | 1.0 | 1.0 |
| | Allyl glycidyl ether (Unit: equivalents) | 2.0 | 2.0 | 1.0 | Not used | 1.0 | 1.0 |
| | Allyl chloride (Unit: equivalents) | 1.5 | 1.5 | 1.5 | 1.5 | 1.5 | 1.5 |
| | Methyldimethoxy silane (Unit: parts by weight) | 2.3 | 3.3 | 1.7 | 3.2 | 2.6 | 3.8 |
| Physical properties of polymer (A) alone | Number of terminal structures in polymer molecule | 2 | 2 | 2 | — | — | — |
| | Total number of groups per terminal structure | 3.0 | 3.0 | 2.0 | — | — | — |
| Physical properties of polymer (B) or (D) alone | Number of terminal structures in polymer molecule | — | — | — | 1 | 1 | 1 |
| | Total number of groups per terminal structure | — | — | — | 1.0 | 2.0 | 2.0 |
| Physical properties of polymer mixture or polymer alone | Number-average molecular weight | 19,000 | 20,000 | 28,000 | 8,000 | 8,000 | 8,000 |
| | Viscosity at 23° C. (Pa · s) | 15 | 19 | 44 | 2 | 2 | 2 |
| | Total number of groups per terminal structure | 3.0 | 3.0 | 2.0 | 1.0 | 2.0 | 2.0 |
| | Degree of hydrolyzable silyl group introduction | 55% | 78% | 78% | 80% | 80% | 64% |
| | Number of hydrolyzable silyl groups per terminal structure | 1.7 | 2.3 | 1.6 | 0.8 | 1.6 | 1.3 |
| | Both ends-terminated component/One end-terminated component (weight ratio) | Both ends-terminated component alone | Both ends-terminated component alone | Both ends-terminated component alone | One end-terminated component alone | One end-terminated component alone | One end-terminated component alone |
| Example in which polymer mixture or polymer was used alone for evaluation of physical properties | | Comp. Example 30 | — | — | — | — | — |

Synthesis Example 21

A four-necked flask equipped with a stirrer was charged with 52.1 parts by weight of isobutyl alcohol, which was heated to 90° C. under nitrogen atmosphere. To the heated isobutyl alcohol was added dropwise over 7 hours a liquid mixture prepared by dissolving 14.5 parts by weight of methyl methacrylate, 68.2 parts by weight of butyl acrylate, 14.9 parts by weight of stearyl methacrylate, 2.4 parts by weight of 3-(dimethoxymethylsilyl)propyl methacrylate, and 0.3 parts by weight of 2,2'-azobis(2-methylbutyronitrile) in 12.4 parts by weight of isobutyl alcohol. The polymerization was allowed to further proceed at 90° C. for 2 hours to obtain an isobutyl alcohol solution (solid content=60% by weight) of a (meth)acrylic ester polymer (C-1) having 1.8 methyldimethoxysilyl groups on average per molecule and having a number-average molecular weight of 17,000 and a weight-average molecular weight of 48,000.

Example 5

Seventy parts by weight of the polymer mixture (AB-1) obtained in Example 1 and 50 parts by weight of the isobutyl alcohol solution of the polymer (C-1) obtained in Synthesis Example 21 were mixed, and isobutyl alcohol was distilled off under reduced pressure to obtain a polymer mixture having a polymer (AB-1)/polymer (C-1) weight ratio of 70/30 and a viscosity at 23° C. of 25 Pa·s. The obtained polymer mixture was used in Example 25.

Comparative Example 5

Seventy parts by weight of the polymer mixture (A-31) obtained in Synthesis Example 11 and 50 parts by weight of the isobutyl alcohol solution of the polymer (C-1) obtained in Synthesis Example 21 were mixed, and isobutyl alcohol was distilled off under reduced pressure to obtain a polymer mixture having a polymer (A-31)/polymer (C-1) weight ratio of 70/30 and a viscosity at 23° C. of 34 Pa·s. The obtained polymer mixture was used in Comparative Example 25.

Example 11

Seventy parts by weight of the polyoxyalkylene polymer (A-35) obtained in Synthesis Example 15 and 30 parts by weight of the polyoxyalkylene polymer (B-21) obtained in Synthesis Example 19 were thoroughly mixed to obtain a polyoxyalkylene mixture.

In this polyoxypropylene mixture, the total number of groups per terminal structure was 2.6, the degree of hydrolyzable silyl group introduction was 64%, the number of the hydrolyzable silyl groups per terminal structure was 1.7, and the viscosity at 23° C. was 9 Pa·s. This polyoxypropylene mixture was used in Example 31.

Examples 12 and 13 and Comparative Examples 11 to 13

Methyldimethoxysilyl-terminated polyoxypropylene mixtures were obtained by using the polymers (A) and polymers (B) or (D) listed in Table 3 and performing the procedures as described in Example 11 with the material proportions indicated in Table 3.

TABLE 3

| | | Example 11 | Example 12 | Example 13 | Comp. Example 11 | Comp. Example 12 | Comp. Example 13 |
|---|---|---|---|---|---|---|---|
| Polymers | Polymer (A) | (A-35) | (A-35) | (A-37) | (A-36) | (A-36) | (A-37) |
| | Polymer (B) or (D) | (B-21) | (B-22) | (B-22) | (D-1) | (B-21) | (D-1) |
| Mixing ratio | Both ends-terminated component/One end-terminated component (weight ratio) | 7/3 | 7/3 | 7/3 | 7/3 | 7/3 | 7/3 |
| Physical properties of polymer (A) alone | Number of terminal structures in polymer molecule | 2 | 2 | 2 | 2 | 2 | 2 |
| | Total number of groups per terminal structure | 3.0 | 3.0 | 2.0 | 3.0 | 3.0 | 2.0 |
| Physical properties of polymer (B) or (D) alone | Number of terminal structures in polymer molecule | 1 | 1 | 1 | 1 | 1 | 1 |
| | Total number of groups per terminal structure | 2.0 | 2.0 | 2.0 | 1.0 | 2.0 | 1.0 |
| Physical properties of polymer mixture alone | Viscosity at 23° C. (Pa·s) | 9 | 9 | 20 | 11 | 11 | 22 |
| | Total number of groups per terminal structure | 2.6 | 2.6 | 2.0 | 2.3 | 2.6 | 1.5 |
| | Degree of hydrolyzable silyl group introduction | 64% | 58% | 72% | 79% | 79% | 79% |
| | Number of hydrolyzable silyl groups per terminal structure | 1.7 | 1.5 | 1.4 | 1.8 | 2.1 | 1.2 |
| Example in which polymer mixture was used for evaluation of physical properties | | Example 31 | Example 32 | Example 33 | Comp. Example 31 | Comp. Example 32 | Comp. Example 33 |

Examples 21 to 33 and Comparative Examples 21 to 33

The following evaluations were conducted using the polymer mixtures or polymers produced in Examples, Comparative Examples, or Synthesis Examples.
<Method of Measuring Modulus at 100% Elongation of Cured Product of Polymer Mixture or Polymer>

The modulus at 100% elongation of the cured product of each of the polymer mixtures or polymers was measured by the measurement method previously described.
<Method of Evaluating Composition Physical Properties>

Each polymer mixture or polymer was thoroughly mixed with some of the additives listed below, in particular fillers, titanium oxide, an anti-sagging agent, a light stabilizer, and an ultraviolet absorber. The resulting mixture was passed through a three-roll paint mill three times to disperse the components to prepare a base material. Subsequently, a dehydrating agent, an adhesion promoter, and a silanol condensation catalyst were added to and thoroughly mixed with the base material, and the resulting mixture was kneaded and defoamed uniformly using a planetary mixer. In this manner, curable compositions were produced from the polymer mixtures and polymers. Each of the curable compositions produced was used to prepare specimens in a constant-temperature and humidity environment with a temperature of 23° C. and a relative humidity of 50%, and the specimens were subjected to the evaluations.
(Additives Used in Examples and Comparative Examples for Evaluation of Composition Physical Properties)

The additives listed below were used for evaluation of the composition physical properties in Examples 21 to 33 and Comparative Examples 21 to 33. The amount of each additive is indicated as parts by weight per 100 parts by weight of the polymer mixture or polymer used as a base polymer.

Reactive diluent (D): Reactive diluent (D-1) produced in Synthesis Example 18, 76 parts by weight
Filler: (i) Fatty acid-treated precipitated calcium carbonate (HAKUENKA CCR, manufactured by Shiraishi Kogyo Kaisha, Ltd.), 120 parts by weight
  (ii) Ground calcium carbonate (WHITON SB RED, manufactured by Shiraishi Calcium Kaisha, Ltd.), 40 parts by weight
Titanium oxide: TIPAQUE R-820 (manufactured by Ishihara Sangyo Kaisha, Ltd.), 10 parts by weight
Anti-sagging agent: Fatty acid amide wax (DISPARLON #6500, manufactured by Kusumoto Chemicals, Ltd.), 2 parts by weight
Light stabilizer: Bis(2,2,6,6-tetramethyl-4-piperidyl) sebacate (Tinuvin 770, manufactured by BASF), 1 part by weight
Ultraviolet absorber: 2-(5-Chloro-2H-benzotriazol-2-yl)-4-methyl-6-tert-butylphenol (Tinuvin 326, manufactured by BASF), 1 part by weight
Dehydrating agent: Vinyltrimethoxysilane (A-171, manufactured by Momentive Performance Materials Inc.), 2 parts by weight
Adhesion promoter: 3-(N-2-aminoethylamino)propyltrimethoxysilane (A-1120, manufactured by Momentive Performance Materials Inc.), 3 parts by weight Silanol condensation catalyst: Dioctyltin dilaurate (U-810, manufactured by Nitto Kasei Co., Ltd.), 2 parts by weight (Physical Properties of Dumbbell-Shaped Specimen)

A 3-mm-thick sheet-shaped mold was charged with the curable composition at a temperature of 23° C. and a relative humidity of 50%. The composition was cured at a temperature of 23° C. and a relative humidity of 50% for 3 days, after which the cured composition was aged in a dryer at 50° C. for 4 days to obtain a sheet-shaped cured product. The cured product obtained was punched to prepare a No. 3 dumbbell-shaped specimen according to JIS K 6251. The specimen prepared was subjected to tensile testing (tensile speed=200 mm/min), which was performed using Autograph at a temperature of 23° C. and a relative humidity of 50% to measure the modulus at 100% elongation, tensile strength at break, and elongation at break.

(Recovery Performance)

The sheet-shaped cured product obtained as above was punched to prepare a No. 7 dumbbell-shaped specimen. Two lines were drawn in the dumbbell-shaped specimen, with the waist portion of the dumbbell-shaped specimen being at the middle between the lines and with a line-to-line distance of 10 mm. The dumbbell-shaped specimen was elongated so that the distance between the lines reached 20 mm, and the specimen fixed in this elongated state was allowed to stand in a dryer at 50° C. After 24 hours, the specimen was released from the elongated state and left at a temperature of 23° C. and a relative humidity of 50% for 24 hours, after which the distance between the lines was measured to determine the recovery rate.

The results obtained by the above procedures are shown in Tables 4 to 8.

TABLE 4

| | | Example 21 | Comp Example 21 | Example 22 | Comp. Example 22 | Example 23 | Comp. Example 23 | Example 24 | Comp. Example 24 | Example 25 | Comp. Example 25 |
|---|---|---|---|---|---|---|---|---|---|---|---|
| Polymer mixture or polymer | | (AB-1) | (A-31) | (AB-2) | (A-32) | (AB-3) | (A-33) | (AB-4) | (A-34) | (AB-1) (C-1) | (A-31) (C-1) |
| Use or non-use of polymer (A)/(B) | | Used/ Used | Used/ Not-used | Used/ Used | Used/ Not-used | Used/ Used | Used/ Not-used | Used/ Used | Used/ Not-used | Used/ Used | Used/ Not-used |
| *Physical properties of polyoxyalkylene polymer (A) alone* | | | | | | | | | | | |
| Number of terminal structures in polymer molecule | | 2 | 2 | 2 | 2 | 2 | 2 | 2 | 2 | 2 | 2 |
| Total number of groups per terminal structure | | 3.0 | 3.0 | 2.7 | 2.5 | 2.2 | 2.4 | 2.0 | 2.0 | 3.0 | 3.0 |
| *Physical properties of polyoxyalkylene polymer (B) alone* | | | | | | | | | | | |
| Number of terminal structures in polymer molecule | | 1 | — | 1 | — | 1 | — | 1 | — | 1 | — |
| Total number of groups per terminal structure | | 3.0 | — | 2.7 | — | 2.2 | — | 2.0 | — | 3.0 | — |
| *Physical properties of polyoxyalkylene polymer mixture or polymer alone* | | | | | | | | | | | |
| Viscosity at 23° C. (Pa·s) | | 11 | 13 | 8 | 8 | 12 | 18 | 4 | 7 | 11 | 13 |
| Total number of groups per terminal structure | | 3.0 | 3.0 | 2.7 | 2.5 | 2.2 | 2.4 | 2.0 | 2.0 | 3.0 | 3.0 |
| Degree of hydrolyzable silyl group introduction | | 55% | 42% | 58% | 46% | 66% | 50% | 61% | 46% | 55% | 42% |
| Number of hydrolyzable silyl groups per terminal structure | | 1.7 | 1.3 | 1.6 | 1.2 | 1.5 | 1.2 | 1.2 | 0.9 | 1.7 | 1.3 |
| Modulus at 100% elongation (MPa) | | 0.17 | 0.18 | 0.24 | 0.22 | 0.17 | 0.18 | 0.21 | 0.20 | 0.17 | 0.18 |
| *Component proportions and physical properties of composition* | | | | | | | | | | | |
| Base polymer Proportions (parts by weight) | Polyoxyalkylene polymer | 100 | 100 | 100 | 100 | 100 | 100 | 100 | 100 | 70 | 70 |
| | (Meth)acrylic ester polymer | — | — | — | — | — | — | — | — | 30 | 30 |
| Physical properties of dumbbell-shaped specimen (No. 3 dumbbell-shaped specimen) | Modulus at 100% elongation (MPa) | 0.25 | 0.25 | 0.24 | 0.28 | 0.22 | 0.20 | 0.33 | 0.28 | 0.29 | 0.33 |
| | Tensile strength at break (MPa) | 1.5 | 1.5 | 1.5 | 1.5 | 1.5 | 1.5 | 1.5 | 1.2 | 1.2 | 1.3 |
| | Elongation at break (%) | 800% | 900% | 800% | 800% | 950% | 1000% | 650% | 650% | 550% | 500% |
| Recovery performance | Recovery rate at 24 hours after release from 24-hour elongation at 50° C. | 48% | 42% | 41% | 34% | 42% | 35% | 46% | 35% | 48% | 44% |

The results shown in Table 4 demonstrate that the cured products of the compositions of Examples which contained the polyoxyalkylene polymer (A)-polyoxyalkylene polymer (B) mixture meeting the requirements of one or more embodiments of the present invention exhibited higher recovery performance than the cured products of the compositions of Comparative Examples which failed to meet the requirements of one or more embodiments of the present invention due to not containing the polyoxyalkylene polymer (B), although the viscosity in Comparative Examples was similar to or higher than that in Examples and the total number of groups per terminal structure and the modulus at elongation in Comparative Examples were similar to those in Examples. No significant difference was observed in the physical properties of the dumbbell-shaped specimens between Examples and Comparative Examples.

Example 25 reveals that the composition of one or more embodiments of the present invention exhibits the same effects also when the composition further contains the (meth)acrylic ester polymer (C) having a hydrolyzable silyl group.

TABLE 5-1

| Polymer mixture | | Example 26 (AB-5) | Example 27 (AB-6) | Comp. Example 26 (AB-21) | Comp. Example 27 (AB-22) |
|---|---|---|---|---|---|
| Physical properties of polyoxyalkylene polymer (A) alone | | | | | |
| Number of terminal structures in polymer molecule | | 2 | 2 | 2 | 2 |
| Total number of groups per terminal structure | | 4.0 | 4.0 | 4.0 | 4.0 |
| Physical properties of polyoxyalkylene polymer (B) alone | | | | | |
| Number of terminal structures in polymer molecule | | 1 | 1 | 1 | 1 |
| Total number of groups per terminal structure | | 4.0 | 4.0 | 4.0 | 4.0 |
| Physical properties of polyoxyalkylene polymer mixture alone | | | | | |
| Viscosity at 23° C. (Pa · s) | | 12 | 12 | 11 | 12 |
| Total number of groups per terminal structure | | 4.0 | 4.0 | 4.0 | 4.0 |
| Degree of hydrolyzable silyl group introduction | | 45% | 54% | 31% | 77% |
| Number of hydrolyzable silyl groups per terminal structure | | 1.8 | 2.2 | 1.2 | 3.1 |
| Modulus at 100% elongation (MPa) | | 0.18 | 0.28 | 0.07 | (*1) |
| Physical properties of composition | | | | | |
| Physical properties of dumbbell-shaped specimen (No. 3 dumbbell-shaped specimen) | Modulus at 100% elongation (MPa) | 0.27 | 0.42 | 0.11 | 0.69 |
| | Tensile strength at break (MPa) | 1.6 | 2.0 | 0.8 | 2.1 |
| | Elongation at break (%) | 800% | 700% | 900% | 500% |
| Recovery performance | Recovery rate at 24 hours after release from 24-hour elongation at 50° C. | 51% | 63% | 30% | 74% |

(*1) Broken before 100% elongation.

TABLE 5-2

| Polymer mixture | Example 28 (AB-7) | Example 29 (AB-8) | Example 30 (AB-9) | Comp. Example 28 (AB-23) |
|---|---|---|---|---|
| Physical properties of polyoxyalkylene polymer (A) alone | | | | |
| Number of terminal structures in polymer molecule | 2 | 2 | 2 | 2 |
| Total number of groups per terminal structure | 2.2 | 2.2 | 2.2 | 2.2 |
| Physical properties of polyoxyalkylene polymer (B) alone | | | | |
| Number of terminal structures in polymer molecule | 1 | 1 | 1 | 1 |
| Total number of groups per terminal structure | 2.2 | 2.2 | 2.2 | 2.2 |
| Physical properties of polyoxyalkylene polymer mixture alone | | | | |
| Viscosity at 23° C. (Pa · s) | 11 | 11 | 11 | 10 |
| Total number of groups per terminal structure | 2.2 | 2.2 | 2.2 | 2.2 |
| Degree of hydrolyzable silyl group introduction | 58% | 66% | 72% | 35% |
| Number of hydrolyzable silyl groups per terminal structure | 1.3 | 1.5 | 1.6 | 0.8 |
| Modulus at 100% elongation (MPa) | 0.13 | 0.18 | 0.24 | Not cured |

TABLE 5-2-continued

|  |  | Example 28 (AB-7) | Example 29 (AB-8) | Example 30 (AB-9) | Comp. Example 28 (AB-23) |
|---|---|---|---|---|---|
| Polymer mixture |  |  |  |  |  |
| Physical properties of composition |  |  |  |  |  |
| Physical properties of dumbbell-shaped specimen (No. 3 dumbbell-shaped specimen) | Modulus at 100% elongation (MPa) | 0.19 | 0.28 | 0.35 | Not cured |
|  | Tensile strength at break (MPa) | 1.3 | 1.7 | 1.9 | — |
|  | Elongation at break (%) | 850% | 850% | 750% | — |
| Recovery performance | Recovery rate at 24 hours after release from 24-hour elongation at 50° C. | 39% | 48% | 53% | — |

The results shown in Tables 5-1 and 5-2 demonstrate that the cured products of the compositions of Examples which contained the polyoxyalkylene polymer (A)-polyoxyalkylene polymer (B) mixture meeting the requirements of one or more embodiments of the present invention had a better balance between flexibility and recovery performance than the cured products of the compositions of Comparative Examples which failed to meet the requirements of one or more embodiments of the present invention in terms of the degree of hydrolyzable silyl group introduction, although the main chain structures and the total number of groups per terminal structure in Comparative Examples were the same as those in Examples.

TABLE 6

|  | Example 28 (AB-7) | Comp. Example 29 (AB-24) |
|---|---|---|
| Polymer mixture |  |  |
| Physical properties of polyoxyalkylene polymer (A) alone |  |  |
| Number of terminal structures in polymer molecule | 2 | 2 |
| Total number of groups per terminal structure | 2.2 | 1.0 |
| Physical properties of polyoxyalkylene polymer (B) alone |  |  |
| Number of terminal structure in polymer molecule | 1 | 1 |
| Total number of groups per terminal structure | 2.2 | 1.0 |
| Physical properties of polyoxyalkylene polymer mixture alone |  |  |
| Viscosity at 23° C. (Pa · s) | 11 | 10 |
| Total number of groups per terminal structure | 2.2 | 1.0 |
| Degree of hydrolyzable silyl group introduction | 58% | 76% |

TABLE 6-continued

|  |  | Example 28 (AB-7) | Comp. Example 29 (AB-24) |
|---|---|---|---|
| Polymer mixture |  |  |  |
| Number of hydrolyzable silyl groups per terminal structure |  | 1.3 | 0.8 |
| Modulus at 100% elongation (MPa) |  | 0.13 | 0.12 |
| Physical properties of composition |  |  |  |
| Physical properties of dumbbell-shaped specimen (No. 3 dumbbell-shaped specimen) | Modulus at 100% elongation (MPa) | 0.19 | 0.17 |
|  | Tensile strength at break (MPa) | 1.3 | 1.2 |
|  | Elongation at break (%) | 850% | 1000% |
| Recovery performance | Recovery rate at 24 hours after release from 24-hour elongation at 50° C. | 39% | 23% |

The results shown in Table 6 demonstrate that the cured product of the composition of Example 28 which contained the polyoxyalkylene polymer (A)-polyoxyalkylene polymer (B) mixture meeting the requirements of one or more embodiments of the present invention exhibited considerably higher recovery performance than the cured product of the composition of Comparative Example 29 which failed to meet the requirements of one or more embodiments of the present invention in terms of the total number of groups per terminal structure, although the main chain structures in Comparative Example 29 were the same as those in Example 28 and the modulus at elongation in Comparative Example 29 was similar to that in Example 28.

TABLE 7

|  | Example 31 | Example 32 | Example 21 | Comp. Example 30 | Comp. Example 31 | Comp. Example 32 |
|---|---|---|---|---|---|---|
| Polymer mixture or polymer | A-35 B-21 | A-35 B-22 | AB-1 | A-35 | A-36 D-1 | A-36 B-21 |
| Physical properties of polyoxyalkylene polymer (A) alone |  |  |  |  |  |  |
| Viscosity at 23° C. (Pa · s) | 15 | 15 | — | 15 | 19 | 19 |
| Number of terminal structures in polymer molecule | 2 | 2 | 2 | 2 | 2 | 2 |
| Total number of groups per terminal structure | 3.0 | 3.0 | 3.0 | 3.0 | 3.0 | 3.0 |
| Degree of hydrolyzable silyl group introduction | 55% | 55% | 55% | 55% | 78% | 78% |
| Number of hydrolyzable silyl groups per terminal structure | 1.7 | 1.7 | 1.7 | 1.7 | 2.3 | 2.3 |
| Modulus at 100% elongation (MPa) | 0.33 | 0.33 | — | 0.36 | (*2) | (*2) |

TABLE 7-continued

|  |  | Example 31 | Example 32 | Example 21 | Comp. Example 30 | Comp. Example 31 | Comp. Example 32 |
|---|---|---|---|---|---|---|---|
| Physical properties of polyoxyalkylene polymer (B) or (D) alone | | | | | | | |
| Viscosity at 23° C. (Pa · s) | | 2 | 2 | — | — | 2 | 2 |
| Number of terminal structures in polymer molecule | | 1 | 1 | 1 | — | 1 | 1 |
| Total number of groups per terminal structure | | 2.0 | 2.0 | 3.0 | — | 1.0 | 2.0 |
| Degree of hydrolyzable silyl group introduction | | 80% | 64% | 55% | — | 80% | 80% |
| Number of hydrolyzable silyl groups per terminal structure | | 1.6 | 1.3 | 1.7 | — | 0.8 | 1.6 |
| Physical properties of polyoxyalkylene polymer mixture alone | | | | | | | |
| Mix proportions (parts by weight) | Polyoxyalkylene polymer (A) | 70 | 70 | 70 | 100 | 70 | 70 |
|  | Polyoxyalkylene polymer (B) | 30 | 30 | 30 | — | 30 | 30 |
| Viscosity at 23° C. (Pa · s) | | 9 | 9 | 11 | — | 11 | 11 |
| Total number of groups per terminal structure | | 2.6 | 2.6 | 3.0 | — | 2.3 | 2.6 |
| Degree of hydrolyzable silyl group introduction | | 64% | 58% | 55% | — | 79% | 79% |
| Number of hydrolyzable silyl groups per terminal structure | | 1.7 | 1.5 | 1.7 | — | 1.8 | 2.1 |
| Modulus at 100% elongation (MPa) | | 0.22 | 0.20 | 0.17 | — | (*2) | (*2) |
| Physical properties of polyoxyalkylene polymer (mixture) composition | | | | | | | |
| Physical properties of dumbbell-shaped specimen (No. 3 dumbbell-shaped specimen) | Modulus at 100% elongation (MPa) | 0.35 | 0.31 | 0.25 | 0.56 | 0.55 | 0.60 |
|  | Tensile strength at break (MPa) | 1.8 | 1.6 | 1.5 | 2.1 | 2.1 | 2.2 |
|  | Elongation at break (%) | 750% | 750% | 800% | 650% | 600% | 600% |
| Recovery performance | Recovery rate at 24 hours after release from 24-hour elongation at 50° C. | 54% | 53% | 48% | 57% | 66% | 70% |

(*2) Broken before 100% elongation.

Each of the mixtures of Examples 31 and 32 listed in Table 7 was one prepared as a polyoxyalkylene polymer (A)-polyoxyalkylene polymer (B) mixture meeting the requirements of one or more embodiments of the present invention by producing the polymers (A) and (B) separately and then mixing the polymers (A) and (B). It is seen that the cured products of the compositions of Examples 31 and 32 showed a significant improvement in flexibility while exhibiting a certain level of recovery performance, as compared to the cured product of the composition of Comparative Example 30 which contained the same polymer (A) as the compositions of Examples 31 and 32 but failed to meet the requirements of one or more embodiments of the present invention due to not containing the polymer (B). It is also seen that the cured products of the compositions of Examples 31 and 32 had a better balance between flexibility and recovery performance than the compositions of Comparative Examples which failed to meet the requirements of one or more embodiments of the present invention in terms of the degree of hydrolyzable silyl group introduction (Comparative Examples 31 and 32) or in terms of the total number of groups per terminal structure in the polymer (B) (Comparative Example 31).

For reference sake, Table 7 shows the results for Example 21 where the polymer (AB-1) was used which met the requirements of one or more embodiments of the present invention and in which the viscosity, the total number of groups per terminal structure, the degree of hydrolyzable silyl group introduction, and the number of hydrolyzable silyl groups per terminal structure were similar to those in the polymer (A-35) used in Comparative Example 30. Although the recovery performance of the cured product was slightly lower in Example 21 than in Comparative Example 30, the cured product of Example 21 showed much improvement in flexibility as demonstrated by the significant reduction in the modulus at elongation and the increase in the degree of elongation.

TABLE 8

| Polymer mixture or polymer | Example 33 A-37 B-22 | Comp. Example 33 A-37 D-1 |
|---|---|---|
| Physical properties of polyoxyalkylene polymer (A) alone | | |
| Viscosity at 23° C. (Pa · s) | 44 | 44 |
| Number of terminal structures in polymer molecule | 2 | 2 |
| Total number of groups per terminal structure | 2.0 | 2.0 |
| Degree of hydrolyzable silyl group introduction | 78% | 78% |
| Number of hydrolyzable silyl groups per terminal structure | 1.6 | 1.6 |
| Modulus at 100% elongation (MPa) | 0.54 | 0.54 |
| Physical properties of polyoxyalkylene polymer (B) or (D) alone | | |
| Viscosity at 23° C. (Pa · s) | 2 | 2 |
| Number of terminal structures in polymer molecule | 1 | 1 |
| Total number of groups per terminal structure | 2.0 | 1.0 |
| Degree of hydrolyzable silyl group introduction | 64% | 80% |
| Number of hydrolyzable silyl groups per terminal structure | 1.3 | 0.8 |
| Physical properties of polyoxyalkylene polymer mixture alone | | |
| Mix proportions (parts by weight) Polyoxyalkylene polymer (A) | 70 | 70 |
| Polyoxyalkylene polymer (B) | 30 | 30 |
| Viscosity at 23° C. (Pa · s) | 20 | 22 |

TABLE 8-continued

| Polymer mixture or polymer | | Example 33 A-37 B-22 | Comp. Example 33 A-37 D-1 |
|---|---|---|---|
| Total number of groups per terminal structure | | 2.0 | 1.5 |
| Degree of hydrolyzable silyl group introduction | | 72% | 79% |
| Number of hydrolyzable silyl groups per terminal structure | | 1.4 | 1.2 |
| Modulus at 100% elongation (MPa) | | 0.30 | 0.28 |
| Physical properties of polyoxyalkylene polymer (mixture) composition | | | |
| Physical properties of dumbbell-shaped specimen (No. 3 dumbbell-shaped specimen) | Modulus at 100% elongation (MPa) | 0.38 | 0.35 |
| | Tensile strength at break (MPa) | 2.4 | 2.4 |
| | Elongation at break (%) | 950% | 1000% |
| Recovery performance | Recovery rate at 24 hours after release from 24-hour elongation at 50° C. | 53% | 47% |

The results shown in Table 8 demonstrate that the cured product of the composition of Example 33 which contained the polyoxyalkylene polymer (A)-polyoxyalkylene polymer (B) mixture meeting the requirements of one or more embodiments of the present invention had a better balance between flexibility and recovery performance than the cured product of the composition of Comparative Example 33 which contained a mixture of polyoxyalkylene polymers having the same main chain structures as the polyoxyalkylene polymers (A) and (B) of Example 33 but which failed to meet the requirements of one or more embodiments of the present invention in terms of the total number of groups per terminal structure in the polymer (B) and in terms of the degree of hydrolyzable silyl group introduction.

The results discussed above prove that a cured product of a curable composition containing the mixture of the polyoxyalkylene polymers (A) and (B) of one or more embodiments of the present invention exhibits low modulus and at the same time high recovery performance and is comparable in other physical properties to existing products, and therefore that the mixture of one or more embodiments of the present invention is suitable for use as a low-viscosity base polymer of a sealing material having high recovery performance and less prone to bleed-out.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A mixture of polyoxyalkylene polymers (A) and (B), each of the polyoxyalkylene polymers (A) and (B) comprising:
a polyoxyalkylene main chain structure and a terminal structure bonded to an end of the main chain structure, wherein:
the terminal structures include hydrolyzable silyl groups and further include terminal olefin groups and/or internal olefin groups,
a number of the terminal structures per molecule of the polyoxyalkylene polymer (A) is 1.5 or more on average,
a number of the terminal structures per molecule of the polyoxyalkylene polymer (B) is 1.2 or less on average,
in each of the polyoxyalkylene polymers (A) and (B), a total number of the hydrolyzable silyl groups, terminal olefin groups, and internal olefin groups in the terminal structures is more than 1.0 on average per terminal structure, and
in the whole mixture, a percentage of a number of moles of the hydrolyzable silyl groups to a total number of moles of the hydrolyzable silyl groups, terminal olefin groups, and internal olefin groups is from 40 to 75%.

2. The mixture according to claim 1, wherein:
the number of the terminal structures in the molecule of the polyoxyalkylene polymer (A) is two or more, and
the number of the terminal structures in the molecule of the polyoxyalkylene polymer (B) is one.

3. A mixture of polyoxyalkylene polymers (A) and (B), each of the polyoxyalkylene polymers (A) and (B) comprising:
a polyoxyalkylene main chain structure and a terminal structure bonded to an end of the main chain structure, wherein:
the terminal structures include hydrolyzable silyl groups and further include terminal olefin groups and/or internal olefin groups,
a number of the terminal structures in a molecule of the polyoxyalkylene polymer (A) is two or more,
a number of the terminal structures in a molecule of the polyoxyalkylene polymer (B) is one,
in each of the polyoxyalkylene polymers (A) and (B), a total number of the hydrolyzable silyl groups, terminal olefin groups, and internal olefin groups in the terminal structures is more than 1.0 on average per terminal structure, and
in the whole mixture, a percentage of a number of moles of the hydrolyzable silyl groups to a total number of moles of the hydrolyzable silyl groups, terminal olefin groups, and internal olefin groups is from 40 to 75%.

4. The mixture according to claim 3, wherein the number of the terminal structures in the molecule of the polyoxyalkylene polymer (A) is two.

5. The mixture according to claim 1, wherein a modulus at 100% elongation of a cured product of the mixture is 0.30 MPa or less.

6. The mixture according to claim 1, wherein in the whole mixture, the percentage of the number of moles of the hydrolyzable silyl groups to the total number of moles of the hydrolyzable silyl groups, terminal olefin groups, and internal olefin groups is from 40 to 70%.

7. The mixture according to claim 1, wherein the terminal structures include a terminal structure containing a moiety derived from an epoxy compound having the terminal olefin group.

8. The mixture according to claim 1, wherein in each of the polyoxyalkylene polymers (A) and (B), the total number of the hydrolyzable silyl groups, terminal olefin groups, and internal olefin groups in the terminal structures is more than 2.0 on average per terminal structure.

9. The mixture according to claim 1, wherein the hydrolyzable silyl group is represented by the following formula (3):

wherein:
$R^2$ represents a substituted or unsubstituted monovalent hydrocarbon group having 1 to 20 carbon atoms or a triorganosiloxy group represented by $(R')_3SiO—$, R' represents a substituted or unsubstituted monovalent hydrocarbon group having 1 to 20 carbon atoms, the three R' groups being the same or different, and Y represents a hydroxy group or a hydrolyzable group, the two Y groups being the same or different.

10. The mixture according to claim 1, wherein in the whole mixture, the number of the hydrolyzable silyl groups is 1.0 or more on average per terminal structure.

11. A curable composition comprising the mixture according to claim 1.

12. The curable composition according to claim 11, further comprising a reactive diluent (D) that is a polymer having 0.5 to less than 1.2 hydrolyzable silyl groups on average per molecule and having a lower viscosity at 23° C. than the mixture.

13. The curable composition according to claim 11, further comprising a (meth)acrylic ester polymer (C) having a hydrolyzable silyl group.

14. A cured product of the curable composition according to claim 11.

15. A method of producing the mixture according to claim 1, the method comprising the steps of:

forming the polyoxyalkylene main chain structures by polymerizing an epoxy compound with a mixture of an initiator having 1.5 or more hydroxy groups on average per molecule and an initiator having 1.2 or less hydroxy groups on average per molecule; and forming the terminal structures at the ends of the main chain structures.

16. The method according to claim 15, wherein:

the initiator having 1.5 or more hydroxy groups on average per molecule has two or more hydroxy groups in the molecule, and the initiator having 1.2 or less hydroxy groups on average per molecule has one hydroxy group in the molecule.

17. A method of producing the mixture according to claim 3, the method comprising the steps of:

forming the polyoxyalkylene main chain structures by polymerizing an epoxy compound with a mixture of an initiator having two or more hydroxy groups in the molecule and an initiator having one hydroxy group in the molecule; and forming the terminal structures at the ends of the main chain structures.

* * * * *